United States Patent
May et al.

(10) Patent No.: US 8,021,571 B2
(45) Date of Patent: Sep. 20, 2011

(54) CHIRAL REACTIVE MESOGEN MIXTURE

(75) Inventors: Alison Linda May, Wimborne (GB); Owain Llyr Parri, Ringwood (GB)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 0 days.

(21) Appl. No.: 12/704,648

(22) Filed: Feb. 12, 2010

(65) Prior Publication Data

US 2010/0208191 A1    Aug. 19, 2010

(30) Foreign Application Priority Data

Feb. 13, 2009  (EP) .................................... 09002018

(51) Int. Cl.
*C09K 19/00* (2006.01)
*C09K 19/06* (2006.01)
*C09K 19/32* (2006.01)
*C09K 19/20* (2006.01)
*C09K 19/12* (2006.01)

(52) U.S. Cl. ........... 252/299.6; 252/299.01; 252/299.61; 252/299.62; 252/299.63; 252/299.65; 252/299.66; 252/299.67; 428/1.1; 349/167; 349/182; 549/369; 549/374; 570/126; 570/127; 570/128; 570/129

(58) Field of Classification Search ............. 252/299.01, 252/299.6–299.67; 428/1.1; 349/167, 182; 549/369, 374; 570/126–129
See application file for complete search history.

(56) References Cited

U.S. PATENT DOCUMENTS 7,597,942 B2 * 10/2009 May et al. ...................... 428/1.1
* cited by examiner

*Primary Examiner* — Geraldina Visconti
(74) *Attorney, Agent, or Firm* — Millen, White, Zelano & Branigan, P.C.

(57) ABSTRACT

The invention relates to chiral reactive mesogen (RM) mixtures, polymer films obtained thereof, and the use of the mixtures and polymer films in optical, electrooptical or electronic components or devices, in decorative, security or cosmetic applications, especially for use in broadband reflective polarizers.

20 Claims, 3 Drawing Sheets

CHIRAL REACTIVE MESOGEN MIXTURE

FIELD OF THE INVENTION

The invention relates to chiral reactive mesogen (RM) mixtures, polymer films obtained thereof, and the use of the mixtures and polymer films in optical, electrooptical or electronic components or devices, in decorative, security or cosmetic applications, especially for use in broadband reflective polarizers.

BACKGROUND AND PRIOR ART

RMs and RM mixtures can be used to make optical films, like compensation, retardation or polarisation films, e.g. for use as components of optical or electrooptical devices like LC displays, through the process of in-situ polymerisation. The optical properties of the films can be controlled by many different factors, such as mixture formulation or substrate properties.

Chiral liquid crystal (CLC) films prepared from RMs are suitable for example for use as reflective polarisers or brightness enhancement films (BEF). The optical properties of the CLC film, like the maximum reflection wavelength and the bandwidth of the reflected wavelength band, can be controlled for example by changing the birefringence and/or the chirality of the RM material.

Prior art reports several ways of preparing a CLC film with a Bragg reflection peak that covers the visible spectrum. Such films are generally described as broadband CLC films. The prior art describes two basic methods of preparing a broadband CLC's, either by using band broadening techniques or by combining three or more narrow band CLC's.

As mentioned above, an important material property that can influence the bandwidth of a CLC is the birefringence of the LC material. LC materials with higher birefringence give wider bandwidth than LC materials with low birefringence. The relationship between bandwidth and birefringence for a CLC is given by the equation $\Delta\lambda = \Delta n \cdot p$.

For example, KR2007-069512(A) and KR2006-43863A describe the preparation of multilayer CLC-BEFs. In these cases, three CLC films are used to make a broadband CLC film. JP 2000-281629 A, WO2007/142206 A1 and GB 2 395 201 A disclose high birefringence RM single compounds for use in wide band CLC films.

However, the materials and films described in prior art show several problems. For example, either a diffusion process is needed to make the film, in which case the processing time is too long, and the line speed too slow, or a multi-layer CLC approach is employed in which more than two layers are required, or the materials disclosed are considered unsuitable for mass production for either cost or technical reasons.

Therefore, there is still a need for materials and methods suitable for the preparation of CLC polymer films do not have the drawbacks as reported in prior art. In particular there is a need for CLC polymer films having a broader bandwidth than that achieved with RM materials and mixtures as disclosed in prior art.

This invention has the aim of providing improved RM mixtures for the preparation of CLC polymer films having the desired properties and not having the drawbacks of the prior art as explained above. Another aim of the invention is to extend the pool of RM mixtures and CLC polymer films available to the expert. Other aims are immediately evident to the expert from the following description.

It has been found that these aims can be achieved by providing RM mixtures and CLC polymer films as claimed in the present invention.

This invention describes RM mixtures containing high birefringence singles that may be used to produce films that can be combined to give a broad band CLC. Furthermore, because the RM mixtures contain high birefringence components, only two films, or even only one film, are required to make a broad band film. Furthermore, this invention describes RM mixtures that can be used to make CLC polymer films that have a selective reflection peak in the visible, are suitable for mass production and are suitable for processing on industry standard coating machines. The RM mixtures can be coated to give well aligned optical films which may be combined with each other and with other optical films to produce a brightness enhancement film suitable for LCD's.

SUMMARY OF THE INVENTION

The invention relates to a mixture comprising, preferably consisting essentially of, the following components A) component A consisting of one or more compounds of formula I

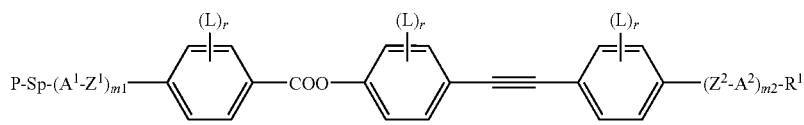

wherein
P is a polymerisable group,
Sp is a spacer group or a single bond,
$A^{1,2}$ independently of each other denote 1,4-phenylene or naphthalene-2,6-diyl, wherein one or more CH groups are optionally be replaced by N, and which are unsubstituted or substituted by one or more groups L,
$Z^{1,2}$ is in case of multiple occurrence independently of one another selected from —COO—, —OCO—, —O—OCO—, —C≡C— or a single bond,
$R^1$ denotes P-Sp-, F, Cl, —CN, —NO$_2$, —NCO, —NCS, —OCN, —SCN, SF$_5$, or straight chain or branched alkyl with 1 to 12 C atoms, wherein one or more CH$_2$ groups are optionally replaced by —O—, —S—, —CO—, —CS— or NR$^0$ in such a manner that O and/or S atoms are not directly linked with each other, and wherein one or more H atoms are optionally replaced by F or Cl,
L is in case of multiple occurrence independently of one another selected from P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, X is halogen, $R^0$ and $R^{00}$ are independently of each other H or alkyl with 1 to 12 C-atoms, r is in case of multiple occurrence independently of one another 0, 1, 2, 3 or 4, preferably 0 or 1, m1 and m2 are independently of each other 0 or 1, and B) component B consisting of one or more reactive mesogens having two or more polymerisable groups, which can be selected from compounds of formula I wherein $R^1$ is P-Sp, or from additional compounds, and C) component C consisting of one or more compounds of formula II

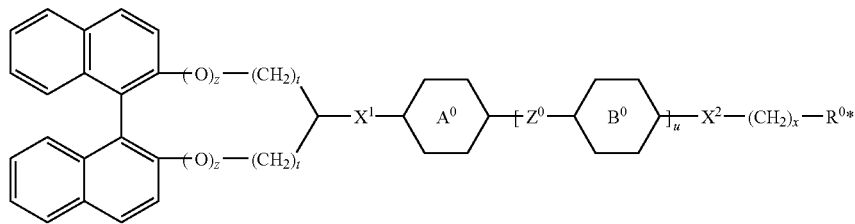

II wherein $R^{0*}$ is H or $P^0$, with $P^0$ being a polymerisable group, preferably an acryl, methacryl, oxetane, epoxy, vinyl, vinyloxy, propenyl ether or styrene group, $A^0$ and $B^0$ are, in case of multiple occurrence independently of one another, 1,4-phenylene that is unsubstituted or substituted with 1, 2, 3 or 4 groups L as defined above, or trans-1,4-cyclohexylene, $X^1$ and $X^2$ are independently of each other —O—, —COO—, —OCO—, —O—CO—O— or a single bond, $Z^0$ is, in case of multiple occurrence independently of one another, —COO—, —OCO—, —O—CO—O—, —OCH$_2$—, —CH$_2$O—, —CF$_2$O—, —OCF$_2$—, —CH$_2$CH$_2$—, —(CH$_2$)$_4$—, —CF$_2$CH$_2$—, —CH$_2$CF$_2$—, —CF$_2$CF$_2$—, —C≡C—, —CH=CH—, —CH=CH—COO—, —OCO—CH=CH— or a single bond, t is, independently of each other 0, 1, 2 or 3, u is 0, 1 or 2, x is 0 or an integer from 1 to 12, z is 0 or 1, and wherein the naphthalene rings can additionally be substituted with one or more identical or different groups L.

The invention further relates to an anisotropic polymer or polymer film comprising or consisting of a polymerised RM mixture as described above and below.

The invention further relates to an anisotropic polymer or polymer film obtainable or obtained by polymerising an RM mixture as described above and below, preferably in its oriented state in form of a thin film or layer.

The invention further relates to the use of a mixture, polymer or polymer film as described above and below in broadband reflective optical polarisers.

The invention further relates to the use of a mixture, polymer or polymer film as described above and below in optical, electrooptical or electronic components or devices.

The invention further relates to an optical, electrooptical or electronic component or device, comprising a mixture, polymer or polymer film as described above and below.

Said devices and components include, without limitation, electrooptical displays, LCDs, optical films, polarizers, compensators, beam splitters, reflective films, alignment layers, colour filters, holographic elements, hot stamping foils, coloured images, decorative or security markings, LC pigments, adhesives, non-linear optic (NLO) devices, optical information storage devices, electronic devices, organic semiconductors, organic field effect transistors (OFET), integrated circuits (IC), thin film transistors (TFT), Radio Frequency Identification (RFID) tags, organic light emitting diodes (OLED), organic light emitting transistors (OLET), electroluminescent displays, organic photovoltaic (OPV) devices, organic solar cells (O-SC), organic laser diodes (O-laser), organic integrated circuits (O-IC), lighting devices, sensor devices, electrode materials, photoconductors, photodetectors, electrophotographic recording devices, capacitors, charge injection layers, Schottky diodes, planarising layers, antistatic films, conducting substrates, conducting patterns, photoconductors, electrophotographic applications, electrophotographic recording, organic memory devices, biosensors, biochips, optoelectronic devices requiring similar phase shift at multiple wavelengths, combined CD/DVD/HD-DVD/Blu-Rays, reading, writing re-writing data storage systems, or cameras.

DEFINITIONS OF TERMS

Figure 1:
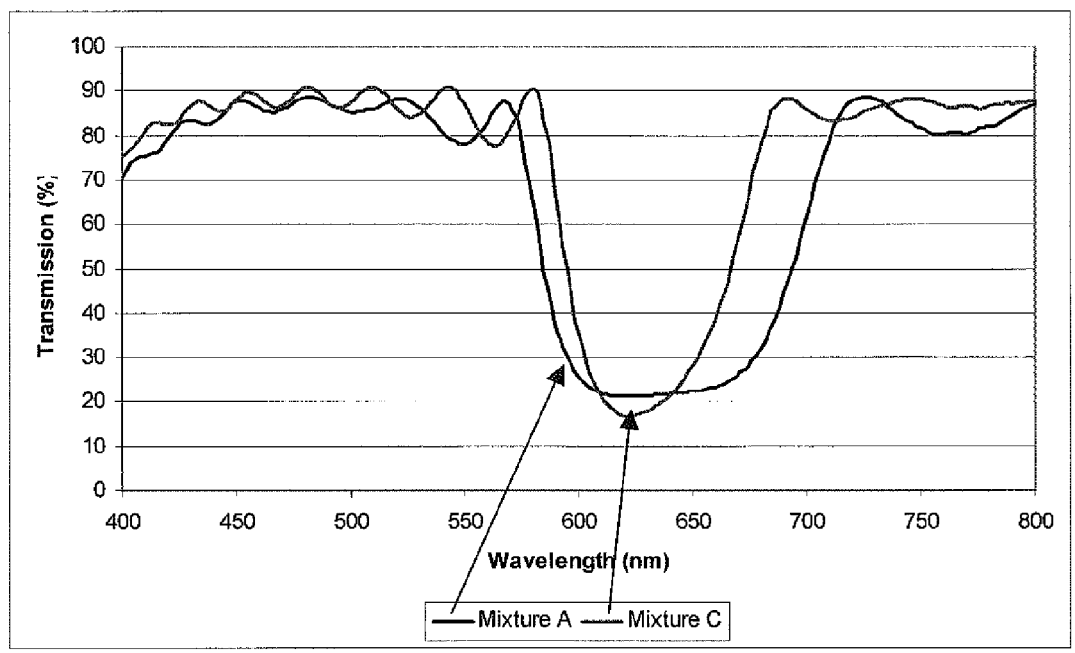
FIG. 1 shows the transmission versus wavelength plots for a polymer film of example 1 and a polymer film of comparison example 1.

The term "liquid crystal", "mesomorphic compound, or "mesogenic compound" (also shortly referred to as "mesogen") means a compound that under suitable conditions of temperature, pressure and concentration can exist as a mesophase or in particular as a LC phase. Non-amphiphilic mesogenic compounds comprise for example one or more calamitic, banana-shaped or discotic mesogenic groups.

The term "calamitic" means a rod- or board/lath-shaped compound or group. The term "banana-shaped" means a bent group in which two, usually calamitic, mesogenic groups are linked through a semi-rigid group in such a way as not to be collinear.

The term "discotic" means a disc- or sheet-shaped compound or group.

The term "mesogenic group" means a group with the ability to induce liquid crystal (LC) phase behaviour. Mesogenic groups, especially those of the non-amphiphilic type, are usually either calamitic or discotic. The compounds comprising mesogenic groups do not necessarily have to exhibit an LC phase themselves. It is also possible that they show LC phase behaviour only in mixtures with other compounds, or when the mesogenic compounds or the mixtures thereof are polymerized. For the sake of simplicity, the term "liquid crystal" is used hereinafter for both mesogenic and LC materials.

A calamitic mesogenic compound is usually comprising a calamitic, i.e. rod- or lath-shaped, mesogenic group consisting of one or more aromatic or alicyclic groups connected to each other directly or via linkage groups, optionally comprising terminal groups attached to the short ends of the rod, and optionally comprising one or more lateral groups attached to the long sides of the rod, wherein these terminal and lateral groups are usually selected e.g. from carbyl or hydrocarbyl groups, polar groups like halogen, nitro, hydroxy, etc., or polymerizable groups.

A discotic mesogenic compound is usually comprising a discotic, i.e. relatively flat disc- or sheet-shaped mesogenic group consisting for example of one or more condensed aromatic or alicyclic groups, like for example triphenylene, and optionally comprising one or more terminal groups that are attached to the mesogenic group and are selected from the terminal and lateral groups mentioned above.

For an overview of terms and definitions in connection with liquid crystals and mesogens see Pure Appl. Chem. 73(5), 888 (2001) and C. Tschierske, G. Pelzl and S. Diele, Angew. Chem. 2004, 116, 6340-6368.

The term "reactive mesogen" (RM) means a polymerizable mesogenic or liquid crystalline compound, which is preferably a monomeric compound.

Polymerizable compounds with one polymerizable group are also referred to as "monoreactive" compounds, compounds with two polymerizable groups as "direactive" compounds, and compounds with more than two polymerizable groups as "multireactive" compounds. Compounds without a polymerizable group are also referred to as "non-reactive" compounds.

The term "spacer" or "spacer group", also referred to as "Sp" below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless stated otherwise, the term "spacer" or "spacer group" above and below denotes a flexible organic group, which in a polymerisable mesogenic compound ("RM") connects the mesogenic group and the polymerisable group(s).

The term "film" includes rigid or flexible, self-supporting or free-standing films with mechanical stability, as well as coatings or layers on a supporting substrate or between two substrates. "Thin film" means a film having a thickness in the nanometer or micrometer range, preferably at least 10 nm, very preferably at least 100 nm, and preferably not more than 100 μm, very preferably not more than 10 μm.

The term "carbyl group" means any monovalent or multivalent organic radical moiety which comprises at least one carbon atom either without any non-carbon atoms (like for example —C≡C—), or optionally combined with at least one non-carbon atom such as N, O, S, P, Si, Se, As, Te or Ge (for example carbonyl etc.). The term "hydrocarbyl group" denotes a carbyl group that does additionally contain one or more H atoms and optionally contains one or more hetero atoms like for example N, O, S, P, Si, Se, As, Te or Ge. A carbyl or hydrocarbyl group comprising a chain of 3 or more C atoms may also be linear, branched and/or cyclic, including spiro and/or fused rings.

DETAILED DESCRIPTION OF THE INVENTION

As mentioned above, the high birefringence RM mixtures of this invention can give CLC films with wider selective reflection peaks and so can be used to reduce the number of films required to make a broadband CLC film. In particular, the RM mixtures of this invention show the following advantageous properties:

they exhibit a high birefringence Δn, usually a Δn>0.2,
they give a stable cholesteric phase at ambient temperature,
they align well to give a Grandjean texture,
they can be polymerised by exposure to UV light,
they have the correct balance of mono- and direactive compounds.

The RM mixtures of this invention are formulated to meet the above criteria. The alignment quality of these RM mixtures on various substrates including PET, TAC and PI glass has shown to be excellent. The RM mixtures are also especially suitable for mass production and can be processed using industry standard coating equipment.

The compounds of formula I (component A) are preferably selected from RMs having a birefringence Δn≧0.2, preferably from 0.2 to 0.5.

Especially preferred are compounds of formula I wherein $R^1$ is selected from alkyl, alkoxy, thioalkyl, alkylcarbonyl, alkoxycarbonyl, alkylcarbonyloxy or alkoxycarbonyloxy with 1 to 12, preferably 1 to 8, very preferably 1 to 6 C atoms, most preferably $OCH_3$.

Further preferred are compounds of formula I wherein m1=0 and/or m2=0.

Very preferred compounds of formula I are selected of formula Ia:

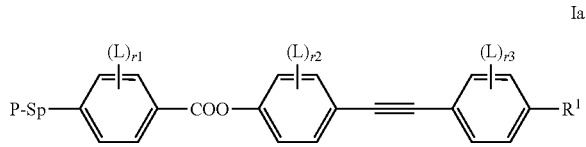

Ia wherein P, Sp and $R^1$ have the meanings given in formula I or one of the preferred meanings given above and below, and r1, r2 and r3 are independently of each other 0, 1, 2, 3 or 4, preferably 0 or 1. Most preferably r2 is different from 0, preferably 1, and r1 and/or r3 are 0.

The concentration of the compounds of component A in the RM mixture is preferably from 30% to 90%, very preferably from 40-70%.

The compounds of formula I can be synthesized according to or in analogy to methods which are known per se and which are described in the literature and in standard works of organic chemistry such as, for example, Houben-Weyl, Methoden der organischen Chemie, Thieme-Verlag, Stuttgart. Suitable compounds of formula I and their synthesis are also described in US 2008/0143943 A1 and U.S. Pat. No. 6,514,578.

The di- or multireactive compounds of component B are preferably selected of formula III $$P\text{-}Sp\text{-}MG\text{-}Sp\text{-}P \qquad\qquad III$$

wherein P and Sp have independently of one another the meanings given in formula I or one of the preferred meanings given above and below, and MG is a rod-shaped mesogenic group, which is preferably selected of formula IV $$-(A^3\text{-}Z^3)_n\text{-}A^4\text{-} \qquad\qquad IV$$

wherein
$A^3$ and $A^4$ are, in case of multiple occurrence independently of one another, an aromatic or alicyclic group, which optionally contains one or more heteroatoms selected from N, O and S, and is optionally mono- or polysubstituted by L as defined above,
$Z^3$ in case of multiple occurrence independently of one another denotes —O—, —S—, —CO—, —COO—, —OCO—, —S—CO—, —CO—S—, —O—COO—, —CO—NR$^0$—, —NR$^0$—CO—, —NR$^0$—CO—NR$^{00}$—, —NR$^0$—CO—O—, —O—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^0$—, —CY$^1$=CY$^2$—, —C≡C—, —CH=CH—COO—, —OCO—CH=CH— or a single bond, preferably —COO—, —OCO— or a single bond,
$R^0$ and $R^{00}$ independently of each other denote H or alkyl with 1 to 12 C-atoms,
$Y^1$ and $Y^2$ independently of each other denote H, F, Cl or CN,
n is 1, 2, 3 or 4, preferably 1 or 2, most preferably 2.

Preferred groups $A^3$ and $A^4$ include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, naphthalene, tetrahydronaphthalene, anthracene and phenanthrene, all of which are unsubstituted or substituted by 1, 2, 3 or 4 groups L as defined above.

Particular preferred groups $A^3$ and $A^4$ are selected from 1,4-phenylene, pyridine-2,5-diyl, pyrimidine-2,5-diyl, thiophene-2,5-diyl, naphthalene-2,6-diyl, 1,2,3,4-tetrahydro-naphthalene-2,6-diyl, indane-2,5-diyl, bicyclooctylene or 1,4-cyclohexylene wherein one or two non-adjacent CH$_2$ groups are optionally replaced by O and/or S, wherein these groups are unsubstituted or substituted by 1, 2, 3 or 4 groups L as defined above.

Preferred compounds of formula III are selected of formula IIIa

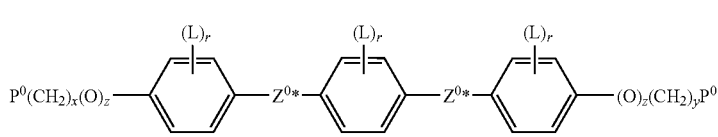

wherein
$Z^{0*}$ is —COO—, —OCO—, —CH$_2$CH$_2$—, —CF$_2$O—, —OCF$_2$—, —C≡C—, —CH=CH—, —OCO—CH=CH—, —CH=CH—COO—, or a single bond,
$P^0$ is, in case of multiple occurrence independently of one another, a polymerisable group, preferably an acryl, methacryl, oxetane, epoxy, vinyl, vinyloxy, propenyl ether or styrene group,
L has the meanings given in formula I and is preferably, in case of multiple occurrence independently of one another, selected from F, Cl, CN or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
x and y are independently of each other 0 or identical or different integers from 1 to 12,
z is 0 or 1, with z being 0 if the adjacent x or y is 0.

Very preferred compounds of formula III are selected from the following formulae:

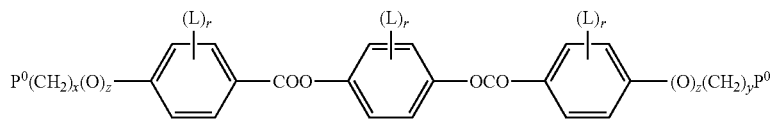

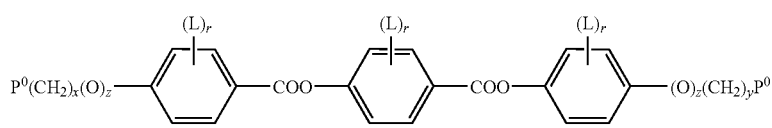

-continued

IIIa3
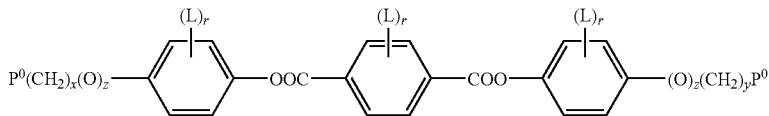

IIIa4
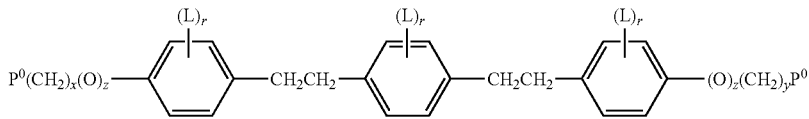

IIIa5
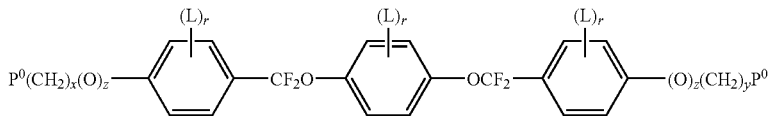

IIIa6
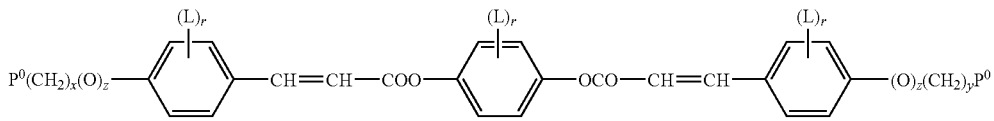

IIIa7
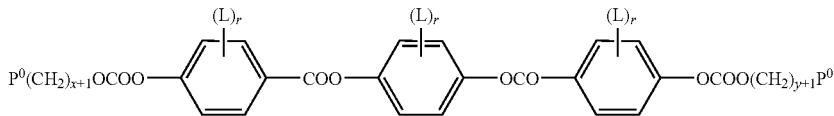

wherein $P^0$, L, r, x, y and z have the meanings given in formula IIIa or one of the preferred meanings given above and below. Especially preferred are compounds of formula IIIa1, IIIa2 and IIIa3, in particular those of formula IIIa1.

In another preferred embodiment the compounds of component B are selected of formula I, or its preferred subformulae, wherein R is P-Sp.

The concentration of the compounds of component B in the RM mixture is preferably from 5% to 50%, very preferably from 20 to 40%.

Suitable compounds of formula II (component C) and their synthesis are described in U.S. Pat. No. 7,223,450. Especially preferred are compounds of formula II wherein $X^1$ is —OCO— or a single bond, $Z^0$ is —COO—, —OCO— or a single bond, $X^1$ is —OCO— and $A^0$ is 1,4-phenylene that is unsubstituted or substituted by one or more groups L as defined above and below, $X^1$ is a single bond and $A^0$ is trans-1,4-cyclohexylene, t is 1, z is 1, u is 0, 1 or 2.

Preferred compounds of formula II are selected of formula IIa

IIa
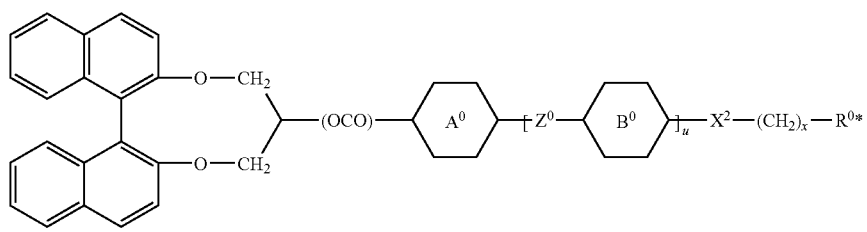

wherein $A^O$, $B^O$, $Z^O$, $R^{O*}$, u and x have the meanings given in formula II or one of the preferred meanings given above and below, and (OCO) denotes —O—CO— or a single bond.
Very preferred compounds of formula II are selected from the group consisting of the following subformulae:
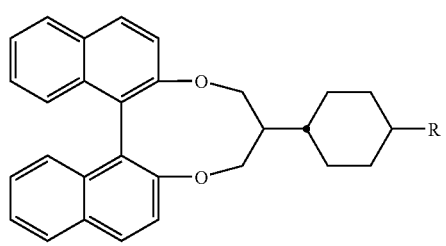
IIa1
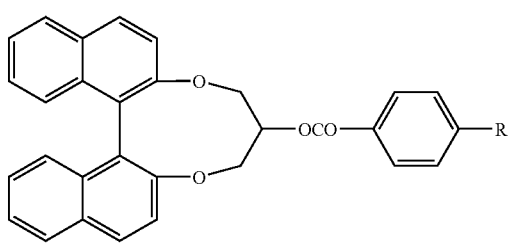
IIa2
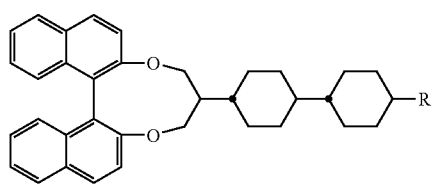
IIa3
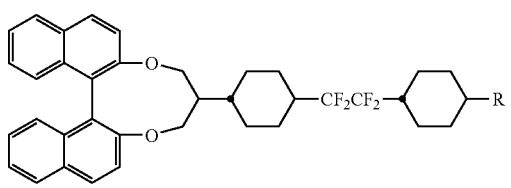
IIa4
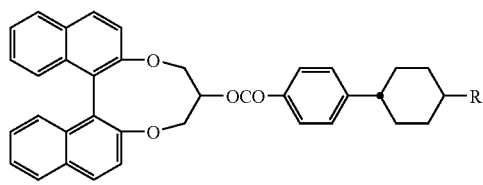
IIa5
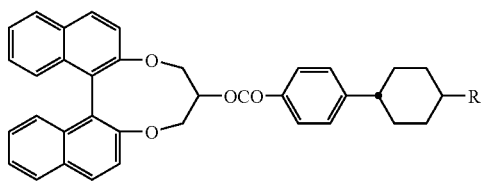
IIa6
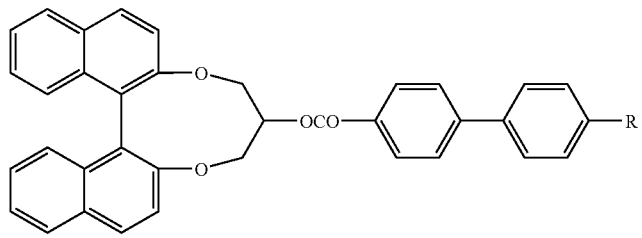
IIa7
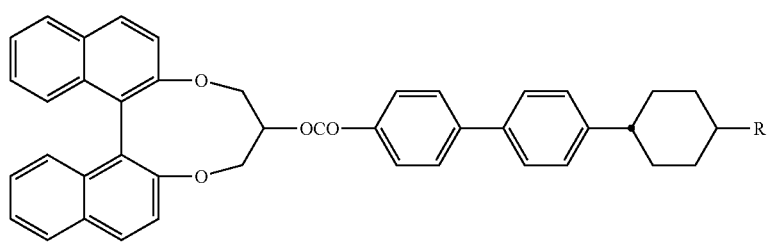
IIa8
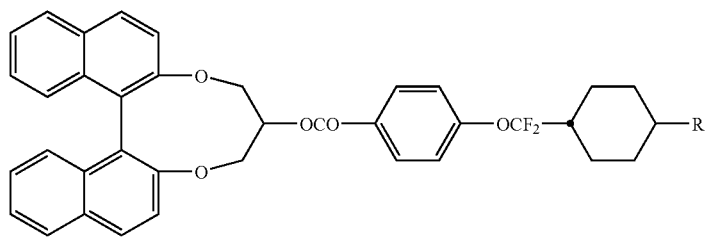
IIa9

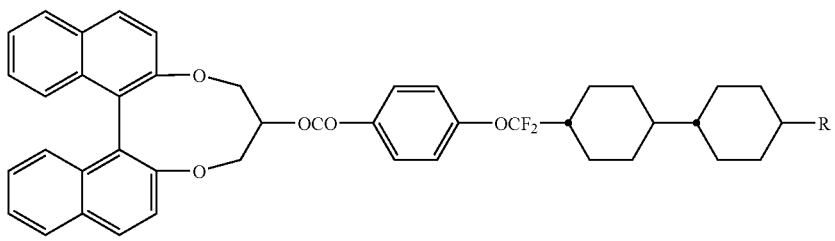

IIa10 wherein R is —X²—(CH₂)ₓ—R⁰* as defined in formula IIa, and the benzene and naphthalene rings are unsubstituted or substituted with 1, 2, 3 or 4 groups L as defined above and below. Preferably R⁰* is P⁰ as defined in formula II.

The concentration of the compounds of component C in the RM mixture is preferably from 0.2 to 10%, very preferably from 2 to 5%.

The polymer film according to the present invention is preferably prepared by providing the RM mixture onto a substrate, aligning the RM mixture into planar alignment (i.e. with the long molecular axes of the RMs and LC molecules aligned parallel to the substrate), and polymerizing the RM mixture in its LC phase at a selected temperature, for example by exposure to heat or actinic radiation, preferably by photopolymerization, very preferably by UV-photopolymerization, to fix the alignment of the LC molecules.

Polymerisation of the RM mixture is preferably carried out in the presence of an initiator absorbing at the wavelength of the actinic radiation. For this purpose, preferably the RM mixture additionally contains a component D consisting of one or more polymerisation initiators.

For example, when polymerising by means of UV light, a photoinitiator can be used that decomposes under UV irradiation to produce free radicals or ions that start the polymerisation reaction. For polymerising acrylate or methacrylate groups preferably a radical photoinitiator is used. For polymerising vinyl, epoxide or oxetane groups preferably a cationic photoinitiator is used. It is also possible to use a thermal polymerisation initiator that decomposes when heated to produce free radicals or ions that start the polymerisation. Typical radical photoinitiators are for example the commercially available Irgacure® or Darocure® (Ciba AG). for example Irgacure 651, Irgacure 907 or Irgacure 369. A typical cationic photoinitiator is for example UVI 6974 (Union Carbide).

In another preferred embodiment component D contains a dichroic or LC photoinitiator as disclosed for example in EP 1 388 538 A1.

The concentration of the polymerisation initiator of component D in the RM mixture is preferably from 0.01 to 8%, very preferably from 0.02 to 5%, most preferably from 3 to 4%.

In another preferred embodiment of the present invention the RM mixture additionally contains a component E consisting of one or more surfactants. The surfactants are selected such that they to promote planar surface alignment of the LC molecules when preparing the polymer film. Suitable surfactants are described for example in J. Cognard, Mol. Cryst. Liq. Cryst. 78, Supplement 1, 1-77 (1981).

Especially preferred are non-ionic surfactants, preferably polymerisable or unpolymerisable fluorocarbon surfactants, like for example Fluorad® FC-171 (from 3M Co.) or Zonyl FSN® (from DuPont), or Fluorad® FX-13 or FX-14, (from 3M Co.) which are acrylic monomers with a perfluoroalkyl group, or mixtures thereof, of the following formulae

  IX (FX-13)

  X (FX-14)

Further preferred are multiblock surfactants having fluorocarbon and hydrocarbon blocks as described in GB 2 383 040 A1, which can be polymerisable or unpolymerisable, and which are preferably selected from the group consisting of the following formulae:

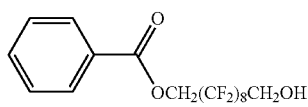 S1

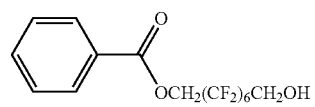 S2

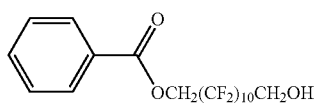 S3

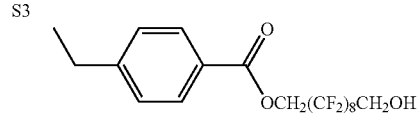 S4

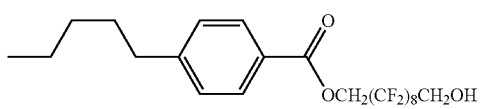 S5

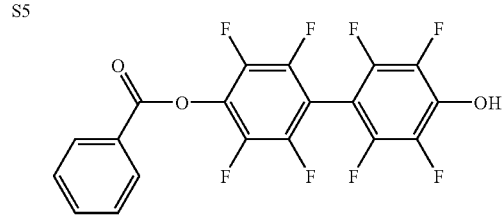 S6

-continued
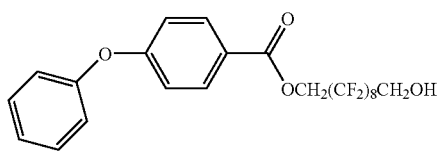
S7
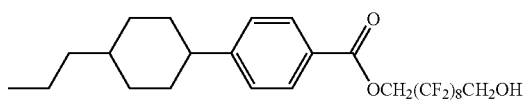
S8
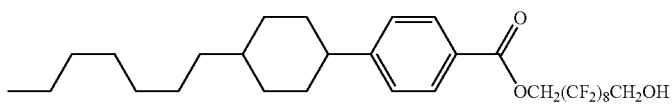
S9
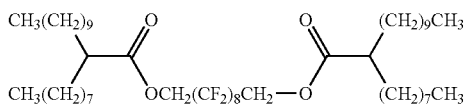
S10
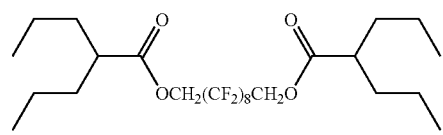
S11
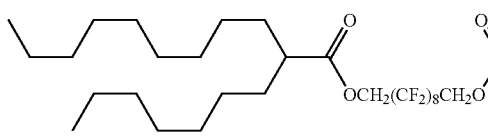
S12
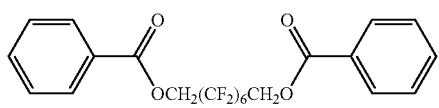
S13
S14
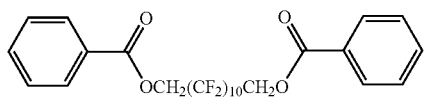
S15
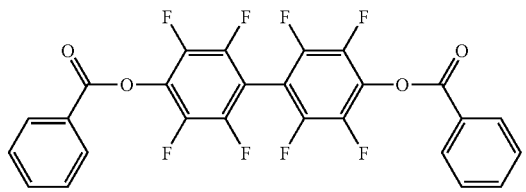
S16
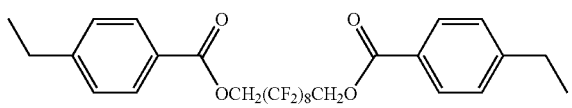
S17
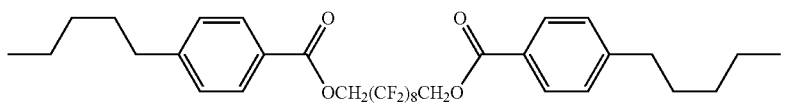
S18
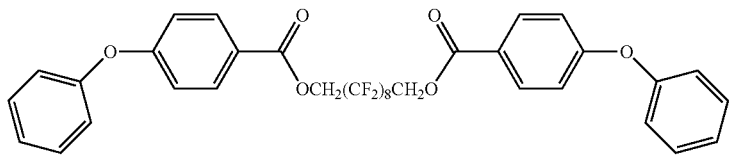
S19
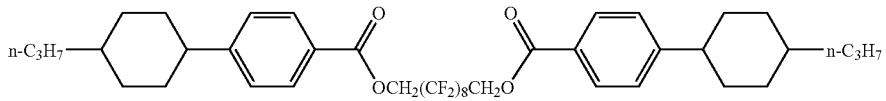
S20
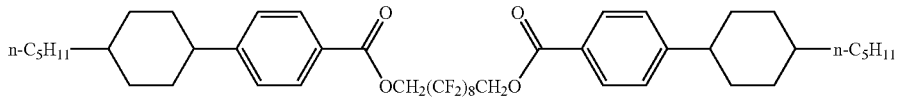
S21
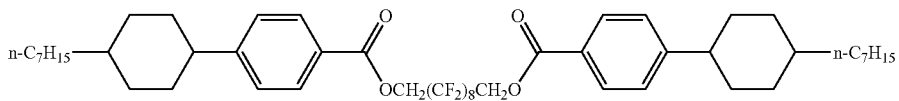
S22

-continued

S23
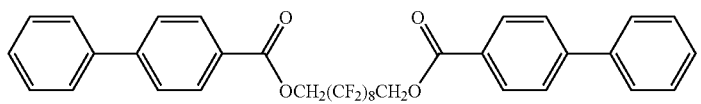

S24
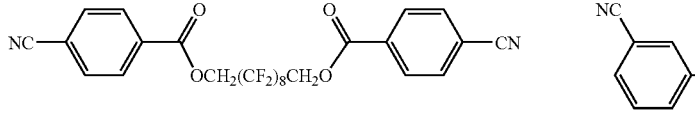

S25
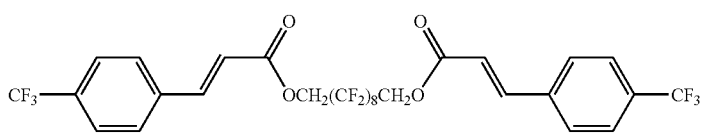

S26
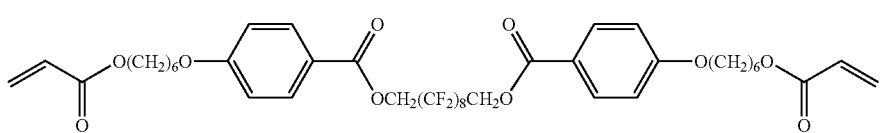

S27
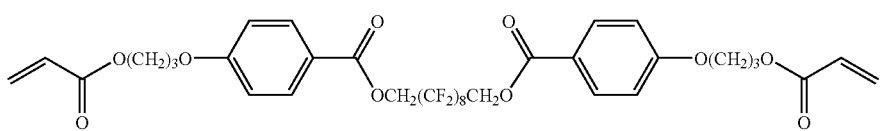

S28
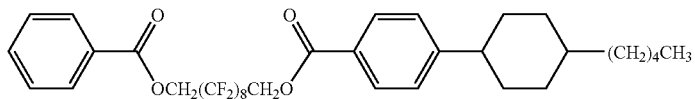

S29
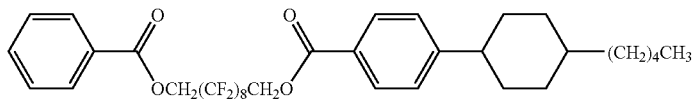

S30
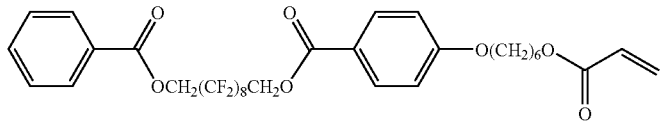

S31
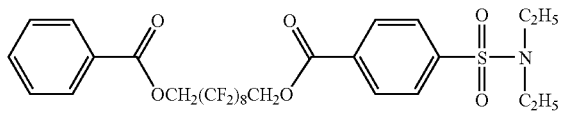

S32
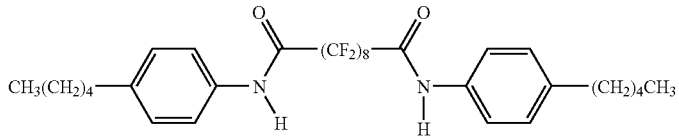

The concentration of the surfactants of component E in the RM mixture is preferably from 0.01 to 2.0%, very preferably from 0.05 to 1%.

In addition to the compounds of components A, B and C the RM mixture may also contain a component F consisting of one or more RMs other than those of formulae I, II, III, IIIa and IIIa1-IIIa7. These further RMs are preferably calamitic monomers. Very preferably these RMs of component F are selected from the following formula:

P-Sp-MG-R$^2$      V wherein P, Sp and MG have the meanings given in formula I, III and IV, R$^2$ denotes F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, X is halogen, and R$^0$ and R$^{00}$ are independently of each other H or alkyl with 1 to 12 C-atoms.

The additional RMs of component F can be prepared by methods which are known per se and which are described in standard works of organic chemistry like for example Houben-Weyl, Methoden der organischen Chemie, Thieme-Verlag, Stuttgart. Suitable RMs are disclosed for example in WO 93/22397, EP 0 261 712, DE 195 04 224, WO 95/22586, WO 97/00600, U.S. Pat. Nos. 5,518,652, 5,750,051, 5,770,107 and 6,514,578. Examples of particularly suitable and preferred RMs of component F are shown in the following list.

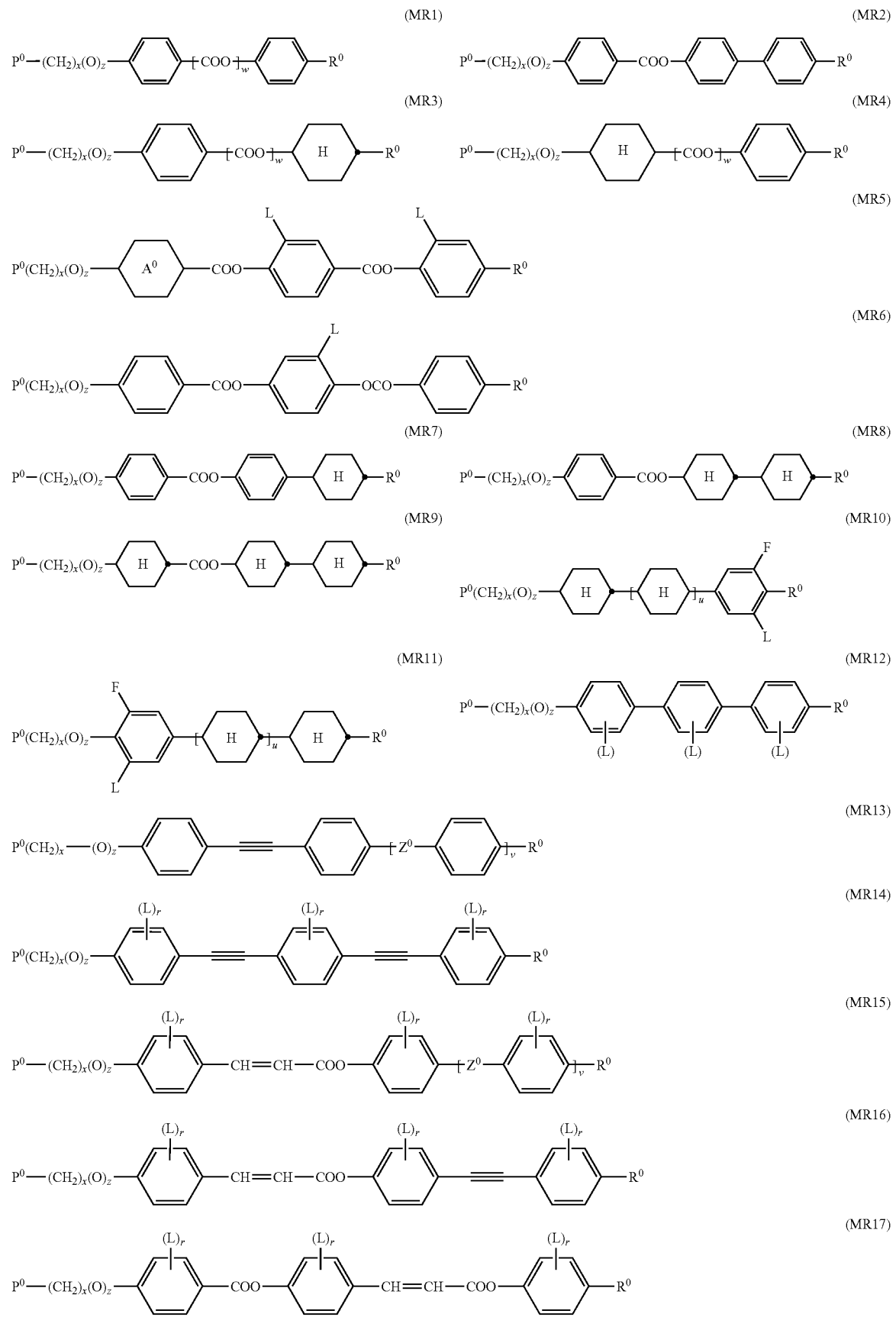

-continued
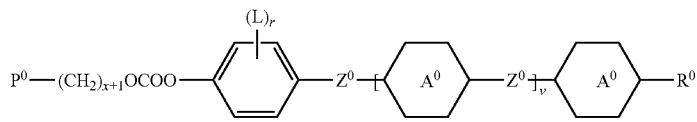
(MR18)
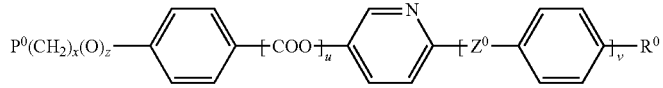
(MR19)
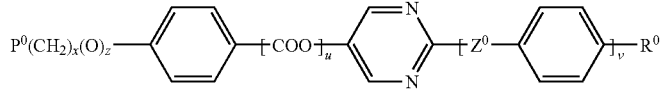
(MR20)
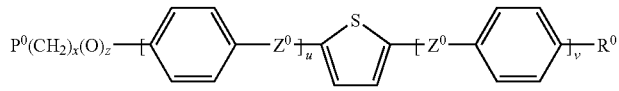
(MR21)
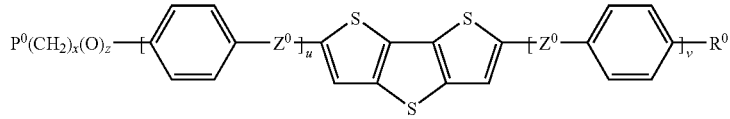
(MR22)
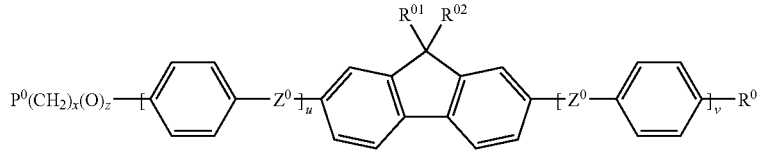
(MR23)
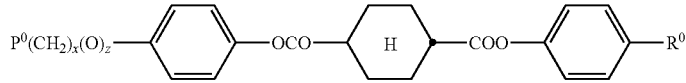
(MR24)
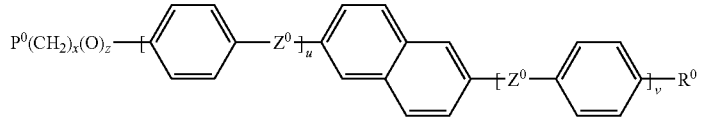
(MR25)
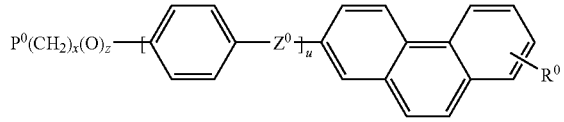
(MR26)
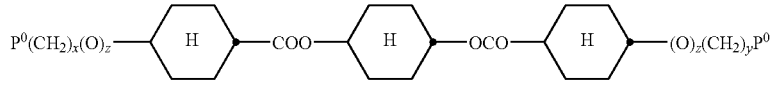
(DR1)
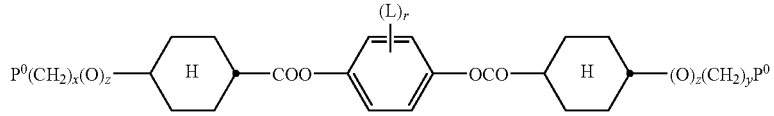
(DR2)
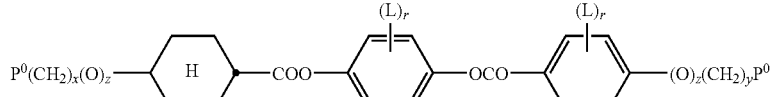
(DR3)
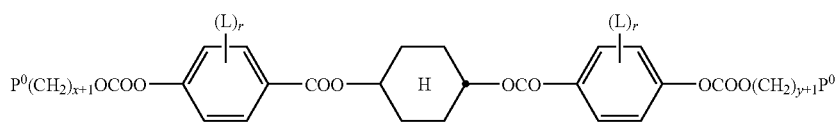
(DR4)

-continued

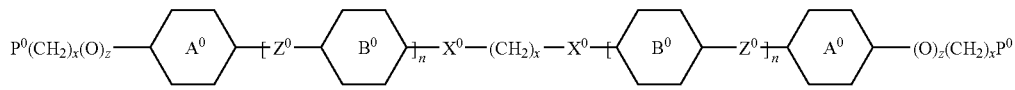
(DR5)

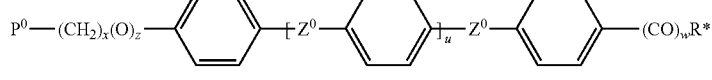
(CR1)

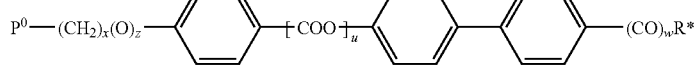
(CR2)

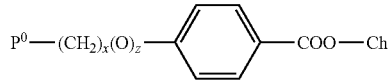
(CR3)

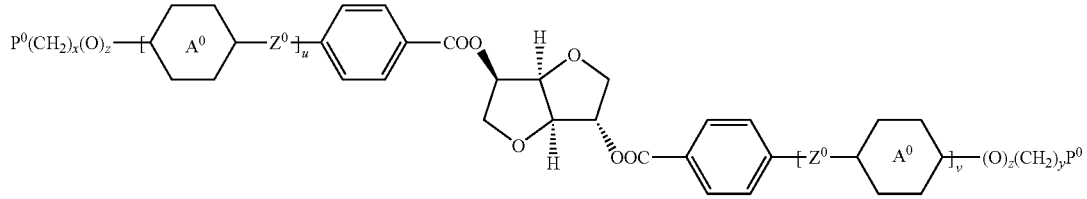
(CR4)

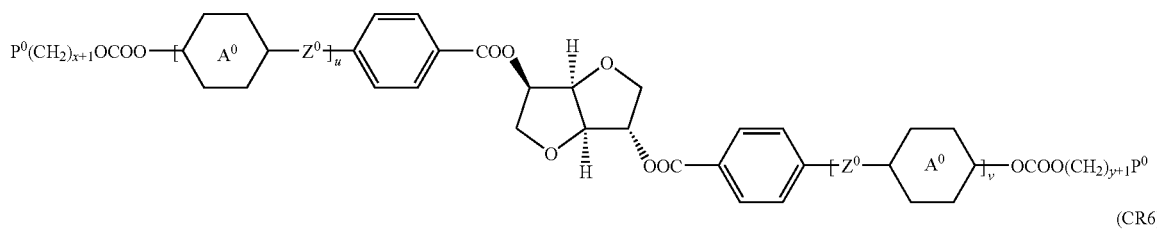
(CR5)

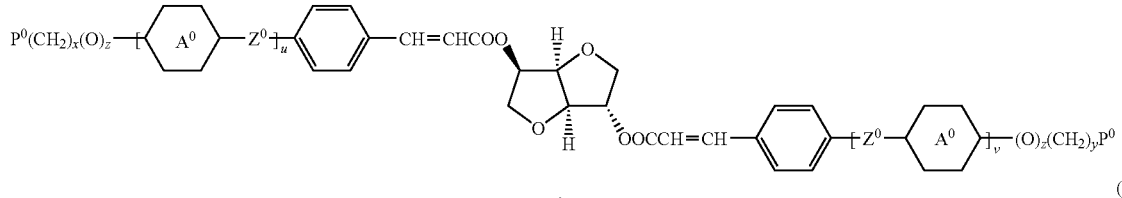
(CR6)

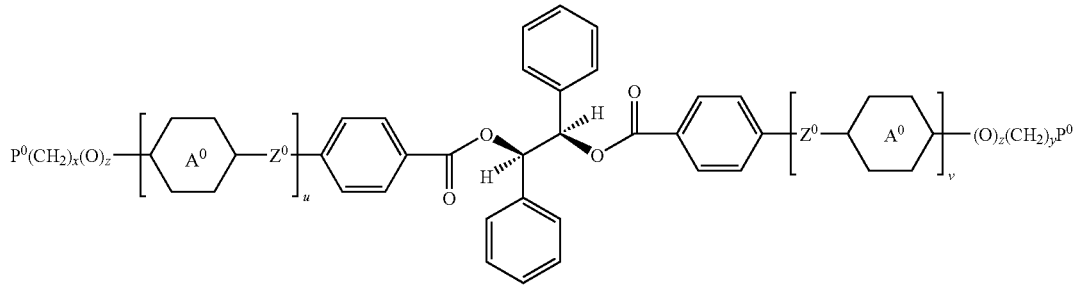
(CR7)

wherein $P^0$ is, in case of multiple occurrence independently of one another, a polymerizable group, preferably an acryl, methacryl, oxetane, epoxy, vinyl, vinyloxy, propenyl ether or styrene group, $A^0$ and $B^0$ are, in case of multiple occurrence independently of one another, 1,4-phenylene that is unsubstituted or substituted with 1, 2, 3 or 4 groups L, or trans-1,4-cyclohexylene, $Z^0$ is, in case of multiple occurrence independently of one another, —COO—, —OCO—, —CH$_2$CH$_2$—, —CF$_2$O—, —OCF$_2$—, —C≡C—, —CH=CH—, —CH=CH—COO—, —OCO—CH=CH— or a single bond, $R^0$ is alkyl, alkoxy, thioalkyl, alkylcarbonyl, alkoxycarbonyl, alkylcarbonyloxy or alkoxycarbonyloxy with 1 or more, preferably 1 to 15 C atoms which is optionally fluorinated, or is $Y^0$ or P—(CH$_2$)$_y$—(O)$_z$—, $X^0$ is —O—, —S—, —CO—, —COO—, —OCO—, —O—COO—, —CO—NR$^{01}$—, —NR$^{01}$—CO—, —NR$^{01}$—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^{01}$—, —CF=CF—, —C≡C—, —CH=CH—COO—, —OCO—CH=CH— or a single bond Y$^0$ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, R$^{01,02}$ are independently of each other H, R$^0$ or Y$^0$, R* is a chiral alkyl or alkoxy group with 4 or more, preferably 4 to 12 C atoms, like 2-methylbutyl, 2-methyloctyl, 2-methylbutoxy or 2-methyloctoxy, Ch is a chiral group selected from cholesteryl, estradiol, or terpenoid radicals like menthyl or citronellyl, L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, t is, in case of multiple occurrence independently of one another, 0, 1, 2 or 3, u and v are independently of each other 0, 1 or 2, w is 0 or 1, x and y are independently of each other 0 or identical or different integers from 1 to 12, z is 0 or 1, with z being 0 if the adjacent x or y is 0, and wherein the benzene and napthalene rings can additionally be substituted with one or more identical or different groups L.

The concentration of the compounds of component F in the RM mixture is preferably from 2 to 30%, very preferably from 5 to 20%.

In another preferred embodiment the RM mixture additionally contains a component G consisting of one or more chain transfer agents to modify the physical properties of the polymer film. By using chain transfer agents the length of the free polymer chains and/or the length of the polymer chains between two crosslinks in the polymer film can be controlled. When the amount of the chain transfer agent is increased, the polymer chain length in the polymer film decreases. Especially preferred chain transfer agents are selected from thiol compounds, very preferably mesogenic or liquid crystalline thiols.

Very preferably component G comprises or consists of one or more thiol compounds, for example monofunctional thiols like dodecane thiol or multifunctional thiols like trimethylpropane tri(3-mercaptopropionate). Very preferred are mesogenic or LC thiols as disclosed for example in U.S. Pat. Nos. 5,948,486, 6,096,241 or 6,319,963. Especially preferred thiols are selected of formula VI:

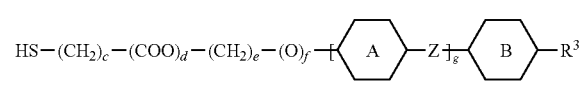

wherein
A and B are independently of each other 1,4-phenylene or 1,4-cyclohexylene1,4-phenylene that is unsubstituted or substituted with 1, 2, 3 or 4 groups L as defined above, or trans-1,4-cyclohexylene, Z is —COO—, —OCO— or a single bond, R$^3$ is F, Cl, CN, or straight chain or branched alkyl, alkenyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, c is 0 or an integer from 1 to 6, d is 0 or 1, e is 0 or an integer from 1 to 12, f is 0 or 1, g is 0, 1 or 2, provided that, if e is 0, at least one of d and f is 0.

Very preferred compounds of formula VI are those selected from the following subformulae:

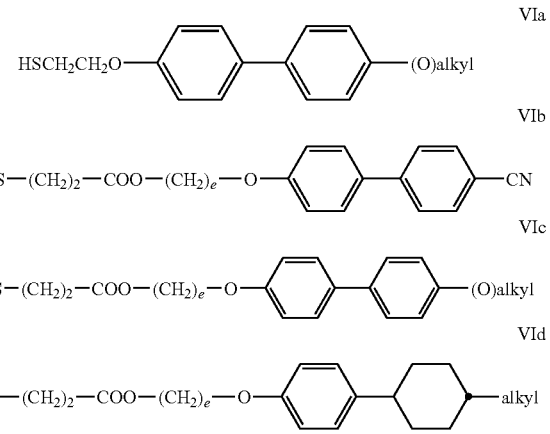

wherein e is 3 or 6, "alkyl" is straight-chain or branched alkyl with 1 to 12, preferably 1 to 6 C atoms and "(O)" is an O atom or a single bond.

The concentration of the chain transfer agents of component G in the RM mixture is preferably from 0.1 to 5%, very preferably from 0.5 to 2%.

In another preferred embodiment the RM mixture additionally contains a component H consisting of one or more absorptive dyes. By adding one or more dyes to the RM mixture it is possible to further enhance the bandwidth of the RM mixtures and polymer films. Especially preferred and suitable dyes are those that absorb between 250 and 400 nm, very preferably those having an absorption maximum at the wavelength of the radiation used for polymerization, in particular UV dyes like e.g. 4,4"-azoxy anisole or Tinuvin® dyes (from Ciba AG, Basel, Switzerland). like for example 2-(2'-hydroxy-5'-(2-methacryloyloxyethyl)phenyl) benzotriazole (compound 1), 2-propenoic acid 2-methyl-2-[4-(acetyloxy)-3-(2H-benzotriazol-2-yl)phenyl]ethyl ester (compound 2), or 1-hexanol-6-[4-[2-[4-(methylsulfonyl)phenyl]ethenyl]phenoxy]-1-acetate (compound 3) as shown below:

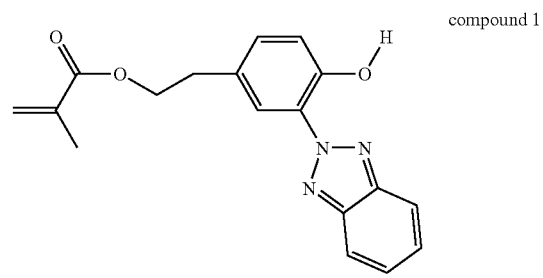

compound 1

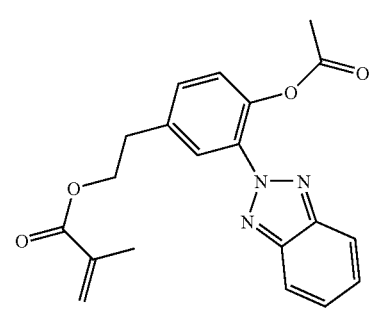

compound 2

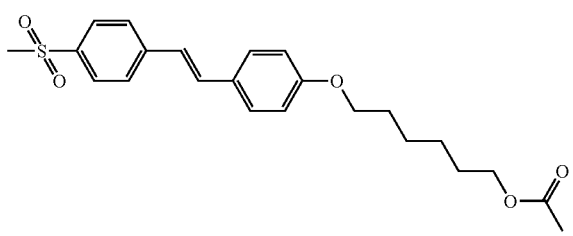

compound 3

The concentration of the dyes of component H in the RM mixture is preferably from 0.1 to 5%, very preferably from 0.5 to 1.5%.

The RM mixture may also contain a component I consisting of one or more stabilizers or inhibitors to prevent undesired spontaneous polymerization, for example selected from the commercially available Irganox® series (Ciba AG), like Irganox 1076. The concentration of the stabilizers of component I in the RM mixture is preferably from 0.01 to 0.2%, very preferably from 0.05 to 0.1%.

In addition to the chiral compounds of component C, the RM mixture may further contain one or more chiral dopants. Suitable unpolymerisable dopants compounds are for example standard chiral dopants like R- or S-811, R- or S-1011, R- or S-2011, R- or S-3011, R- or S-4011, R- or S-5011, or CB 15 (all available from Merck KGaA, Darmstadt, Germany), sorbitols as described in WO 98/00428, hydrobenzoins as described in GB 2,328,207, chiral binaphthols as described in WO 02/94805, chiral binaphthol acetals as described in WO 02/34739, chiral TADDOLs as described in WO 02/06265, or chiral compounds having fluorinated linkage groups as described in WO 02/06196 or WO 02/06195. Suitable polymerisable chiral compounds are for example those of formulae (CR1) to (CR7) listed above, or the polymerisable chiral material Paliocolor® LC756 (from BASF AG, Ludwigshafen, Germany).

Another preferred embodiment of the present invention relates to a solution containing comprising the RM mixture and one or more solvents. As solvents for example standard organic solvents can be used. The solvents can be selected for example from ketones such as acetone, methyl ethyl ketone, methyl propyl ketone or cyclohexanone; acetates such as methyl, ethyl or butyl acetate or methyl acetoacetate; alcohols such as methanol, ethanol or isopropyl alcohol; aromatic solvents such as toluene or xylene; halogenated hydrocarbons such as di- or trichloromethane; glycols or their esters such as PGMEA (propyl glycol monomethyl ether acetate), γ-butyrolactone, and the like. It is also possible to use binary, ternary or higher mixtures of the above solvents. The concentration of the RM mixture in the solvent is preferably from 20 to 60% (referring to the total concentration of all components of the RM mixture in the solvent).

The RM mixture may also comprise one or more monoreactive polymerisable non-mesogenic compounds, preferably in an amount of 0 to 30%, very preferably 0 to 15%. Typical examples are alkylacrylates or alkylmethacrylates.

The RM mixture may also comprise one or more di- or multireactive polymerizable non-mesogenic compounds, preferably in an amount of 0 to 30%, very preferably 0 to 15%, alternatively or in addition to the di- or multireactive polymerizable mesogenic compounds. Typical examples of direactive non-mesogenic compounds are alkyldiacrylates or alkyldimethacrylates with alkyl groups of 1 to 20 C atoms. Typical examples of multireactive non-mesogenic compounds are trimethylpropanetrimethacrylate or pentaerythritoltetraacrylate.

The RM mixture may also comprise a polymeric binder or one or more monomers capable of forming a polymeric binder, and/or one or more dispersion auxiliaries. Suitable binders and dispersion auxiliaries are disclosed for example in WO 96/02597. Preferably, however, the RM mixture does not contain a binder or dispersion auxiliary.

The RM mixture can additionally comprise one or more additives like for example catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments or nanoparticles.

Very preferred is an RM mixture comprising or consisting of, preferably essentially, very preferably exclusively, a polymerisable component and optionally a non-polymerisable component, wherein
the polymerisable component consists, preferably exclusively, of
a component A as described above and below (tolane RMs),
a component B as described above and below (multireactive RMs),
a component C as described above and below (chiral compounds),
optionally a component F as described above and below (additional RMs),
the non-polymerisable component contains one or more components selected from the group consisting of:
a component D as described above and below (initiators),
a component E as described above and below (surfactants),
a component G as described above and below (chain transfer agents),
a component H as described above and below (dyes),
a component I as described above and below (stabilizers).

Further preferred is an RM mixture comprising or consisting of, preferably essentially, very preferably exclusively, the following components
a component A as described above and below,
a component B as described above and below,
a component C as described above and below,
a component D as described above and below,
optionally a component E as described above and below,
and one or more components selected from the group consisting of:
a component F consisting of one or more RMs different from formula I-III,
a component G consisting of one or more chain transfer agents,
a component H consisting of one or more dyes,
a component I consisting of one or more stabilizers.

The RM mixture preferably contains no other polymerisable compounds than those of component A, B, C and F.

The RM mixture preferably exhibits a cholesteric LC phase, very preferably a cholesteric phase at room temperature, or a smectic phase and a cholesteric phase.

The compounds of components D, E, G, H and I are known from the literature or commercially available. The compounds of components A, B, C and F can be synthesized according to or in analogy to methods which are known per se and which are described in the literature and in standard works of organic chemistry such as, for example, Houben-Weyl, Methoden der organischen Chemie, Thieme-Verlag, Stuttgart. Especially suitable methods are disclosed in U.S. Pat. No. 6,203,724. Further suitable methods of synthesis are also described below and in the examples.

The compounds of formula I can be generally synthesized by initially reacting a suitably substituted acetylene, e.g. (trimethylsilyl)acetylene, with a suitable cyclohexanone in the presence of butyllithium, as described e.g. in ACS Symposium Series (2001), 798 (Anisotropic Organic Materials), 195-205. Esterification of the resulting tertiary alcohol with a suitable carboxylic acid yields an ester product. The axial acetylenic substituent is then coupled to a reactive discotic derivative of the formula $D(B-G)_z$, wherein D, B and Z have the meanings of formula I and G is a suitable reactive group or leaving group, e.g. bromine or iodine, via a palladium catalyzed coupling reaction in analogy to the method as described e.g. in either J. Org. Chem. 1997, 62, 7471, or Tetrahedron Lett. 1993, 6403.

In the formulae as shown above and below, the substituents L are preferably selected from F, Cl, CN, $NO_2$ or straight chain or branched alkyl, alkoxy, alkylcarbonyl, alkoxycarbonyl, alkylcarbonlyoxy or alkoxycarbonyloxy with 1 to 12 C atoms, wherein the alkyl groups are optionally perfluorinated, or P-Sp-.

Very preferred substituents L are selected from F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, in particular F, Cl, CN, $CH_3$, $C_2H_5$, $C(CH_3)_3$, $CH(CH_3)_2$, $OCH_3$, $COCH_3$ or $OCF_3$, most preferably F, Cl, $CH_3$, $C(CH_3)_3$, $OCH_3$ or $COCH_3$, or P-Sp-.

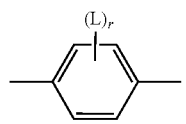

is preferably

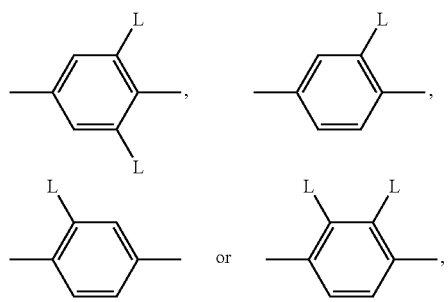

with L having each independently one of the meanings given above.

An alkyl or alkoxy radical, i.e. where the terminal $CH_2$ group is replaced by —O—, can be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkyl group wherein one or more $CH_2$ groups are replaced by —CH═CH— can be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_{74}$-alkenyl, $C_6$-$C_{75}$-alkenyl and $C_{7-6}$-alkenyl, in particular $C_2$-$C_7$-1 E-alkenyl, $C_4$-$C_{73}$E-alkenyl and $C_5$-$C_{74}$-alkenyl. Examples for particularly preferred alkenyl groups are vinyl, 1E-propenyl, 1E-butenyl, 1E-pentenyl, 1 E-hexenyl, 1 E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

In an alkyl group wherein one $CH_2$ group is replaced by —O— and one by —CO—, these radicals are preferably neighboured. Accordingly these radicals together form a carbonyloxy group —CO—O— or an oxycarbonyl group —O—CO—. Preferably this group is straight-chain and has 2 to 6 C atoms. It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl, 4-(methoxycarbonyl)-butyl.

An alkyl group wherein two or more $CH_2$ groups are replaced by —O— and/or —COO— can be straight-chain or branched. It is preferably straight-chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

An alkyl or alkenyl group that is monosubstituted by CN or CF$_3$ is preferably straight-chain. The substitution by CN or CF$_3$ can be in any desired position.

An alkyl or alkenyl group that is at least monosubstituted by halogen is preferably straight-chain. Halogen is preferably F or Cl, in case of multiple substitution preferably F. The resulting groups include also perfluorinated groups. In case of monosubstitution the F or Cl substituent can be in any desired position, but is preferably in ω-position. Examples for especially preferred straight-chain groups with a terminal F substituent are fluoromethyl, 2-fluoroethyl, 3-fluoropropyl, 4-fluorobutyl, 5-fluoropentyl, 6-fluorohexyl and 7-fluoroheptyl. Other positions of F are, however, not excluded.

R$^0$ and R$^{00}$ are preferably selected from H, straight-chain or branched alkyl with 1 to 12 C atoms.

—CY$^1$=CY$^2$— is preferably —CH=CH—, —CF=CF— or —CH=C(CN)—.

Halogen is F, Cl, Br or I, preferably F or Cl.

R, R$^1$ and R$^2$ can be an achiral or a chiral group. Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methyl heptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

Preferred achiral branched groups are isopropyl, isobutyl (=methylpropyl), isopentyl (=3-methylbutyl), isopropoxy, 2-methyl-propoxy and 3-methylbutoxy.

The polymerizable group P and P$^0$ denote a group that is capable of participating in a polymerization reaction, like radical or ionic chain polymerization, polyaddition or polycondensation, or capable of being grafted, for example by condensation or addition, to a polymer backbone in a polymer analogous reaction. Especially preferred are polymerizable groups for chain polymerization reactions, like radical, cationic or anionic polymerization. Very preferred are polymerizable groups comprising a C—C double or triple bond, and polymerizable groups capable of polymerization by a ring-opening reaction, like oxetanes or epoxides.

Suitable and preferred polymerizable arouos include, without limitation, CH$_2$=CW$^1$—COO—, CH$_2$=CW$^1$—CO—,

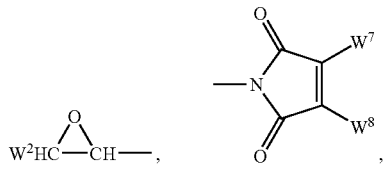

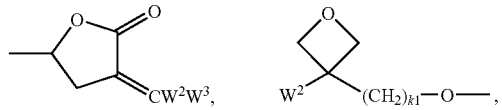

CH$_2$=CW$^2$—(O)$_{k1}$—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN—, and W$^4$W$^5$W$^6$Si—, with W$^1$ being H, F, Cl, CN, CF$_3$, phenyl or alkyl with 1 to 5 C-atoms, in particular H, Cl or CH$_3$, W$^2$ and W$^3$ being independently of each other H or alkyl with 1 to 5 C-atoms, in particular H, methyl, ethyl or n-propyl, W$^4$, W and W$^6$ being independently of each other Cl, oxaalkyl or oxacarbonylalkyl with 1 to 5 C-atoms, W$^7$ and W$^8$ being independently of each other H, Cl or alkyl with 1 to 5 C-atoms, Phe being 1,4-phenylene that is optionally substituted, preferably by one or more groups L as defined above (except for the meaning P-Sp-), and k$_1$ and k$_2$ being independently of each other 0 or 1.

Very preferred polymerizable groups are selected from CH$_2$=CW$^1$—COO—, CH$_2$=CW$^1$—CO—,

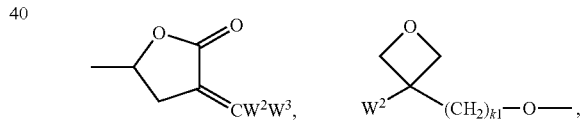

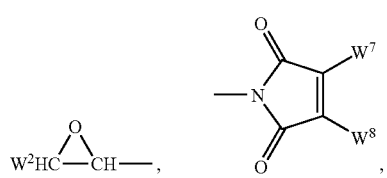

(CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN—, and W$^4$W$^5$W$^6$Si—, with W$^1$ being H, F, Cl, CN, CF$_3$, phenyl or alkyl with 1 to 5 C-atoms, in particular H, F, C$_1$ or CH$_3$, W$^2$ and W$^3$ being independently of each other H or alkyl with 1 to 5 C-atoms, in particular H, methyl, ethyl or n-propyl, W$^4$, W$^5$ and W$^6$ being independently of each other Cl, oxaalkyl or oxacarbonylalkyl with 1 to 5 C-atoms, W$^7$ and W$^8$ being independently of each other H, Cl or alkyl with 1 to 5 C-atoms, Phe being 1,4-phenylene that is optionally substituted preferably by one or more groups L as defined above (except for the meaning P-Sp-), and k$_1$ and k$_2$ being independently of each other 0 or 1.

Most preferred polymerizable groups are selected from CH$_2$=CH—COO—, CH$_2$=C(CH$_3$)—COO—, CH$_2$=CF—COO—, (CH$_2$=CH)$_2$CH—OCO—, (CH$_2$=CH)$_2$CH—O—,

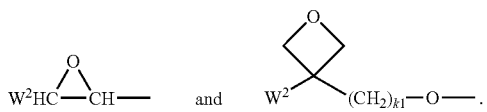

Polymerization can be carried out according to methods that are known to the ordinary expert and described in the literature, for example in D. J. Broer; G. Ghana; G. N. Mol, *Macromol. Chem.*, 1991, 192, 59.

The spacer group Sp is preferably selected of formula Sp'-X', such that P-Sp- is P-Sp'-X'—, wherein Sp' is alkylene with 1 to 20 C atoms, preferably 1 to 12 C-atoms, which is optionally mono- or polysubstituted by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —S—CO—, —CO—S—, —$NR^0$—CO—O—, —O—CO—$NR^0$—, —$NR^0$—CO—$NR^0$—CH=CH— or —C≡C— in such a manner that O and/or S atoms are not linked directly to one another, X' is —O—, —S—, —CO—, —COO—, —OCO—, —O—OCO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CY^1$=$CY^2$—, —C≡C—, —CH=CH—COO—, —OCO—CH=CH— or a single bond, $R^0$ and $R^{00}$ are independently of each other H or alkyl with 1 to 12 C-atoms, and $Y^1$ and $Y^2$ are independently of each other H, F, Cl or CN.

X' is preferably —O—, —S—CO—, —COO—, —OCO—, —O—OCO—, —CO—$NR^0$—, —$NR^0$—CO—, —$NR^0$—CO—$NR^0$— or a single bond.

Typical groups Sp' are, for example, —$(CH_2)_{p1}$—, —$(CH_2CH_2O)_{q1}$—$CH_2CH_2$—, —$CH_2CH_2$—S—$CH_2CH_2$— or —$CH_2CH_2$—NH—$CH_2CH_2$— or —$(SiR^0R^{00}$—O$)_{p1}$—, with p1 being an integer from 2 to 12, q1 being an integer from 1 to 3 and $R^0$ and $R^{00}$ having the meanings given above.

Preferred groups Sp' are ethylene, propylene, butylene, pentylene, hexylene, heptylene, octylene, nonylene, decylene, undecylene, dodecylene, octadecylene, ethyleneoxyethylene, methyleneoxy-butylene, ethylene-thioethylene, ethylene-N-methyl-iminoethylene, 1-methylalkylene, ethenylene, propenylene and butenylene for example. Further preferred are chiral spacer groups.

Further preferred are compounds wherein the polymerizable group is directly attached to the mesogenic group without a spacer group Sp.

In case of compounds with two or more groups P-Sp-, the polymerizable groups P and the spacer groups Sp can be identical or different.

In another preferred embodiment the calamitic compounds comprise one or more terminal groups $R^{1,2}$ or substituents L or $R^3$ that are substituted by two or more polymerizable groups P or P-Sp- (multifunctional polymerizable groups). Suitable multifunctional polymerizable groups of this type are disclosed for example in U.S. Pat. No. 7,060,200 B1 oder US 2006/0172090 A1. Very preferred are compounds comprising one or more multifunctional polymerizable groups selected from the following formulae:

| | |
|---|---|
| —X-alkyl-$CHP^1$—$CH_2$—$CH_2P^2$ | P1 |
| —X'-alkyl-C($CH_2P^1$)($CH_2P^2$)—$CH_2P^3$ | P2 |
| —X-alkyl-$CHP^1CHP^2$—$CH_2P^3$ | P3 |
| —X'-alkyl-C($CH_2P^1$)($CH_2P^2$)—$C_{aa}H_{2aa+1}$ | P4 |
| —X'-alkyl-$CHP^1$—$CH_2P^2$ | P5 |
| —X'-alkyl-$CHP^1P^2$ | P5 |
| —X'-alkyl-$CP^1P^2$—$C_{aa}H_{2aa+1}$ | P6 |
| —X'-alkyl-C($CH_2P^1$)($CH_2P^2$)—$CH_2OCH_2$—C($CH_2P^3$)($CH_2P^4$)$CH_2P^5$ | P7 |
| —X'-alkyl-CH(($CH_2)_{aa}P^1$)(($CH_2)_{bb}P^2$) | P8 |
| —X'-alkyl-$CHP^1CHP^2$—$C_{aa}H_{2aa+1}$ | P9 | wherein alkyl is straight-chain or branched alkylene having 1 to 12 C-atoms which is unsubstituted, mono- or polysubstituted by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —O—CO—O—, —S—CO—, —CO—S—, —$SO_2$—, —CO—$NR^0$—, —$NR^0$—CO—, —$NR^0$—CO—$NR^{00}$—, —$CY^1$=$CY^2$— or —C≡C— in such a manner that O and/or S atoms are not linked directly to one another, with $R^0$ and $R^{00}$ having the meanings given above, or denotes a single bond, aa and bb are independently of each other 0, 1, 2, 3, 4, 5 or 6, X' is as defined above, and $p^{1-5}$ independently of each other have one of the meanings given for P above.

The preparation of chiral LC polymer films according to this invention can be carried out by methods that are known to the skilled person and described in the literature, for example in D. J. Broer; G. Challa; G. N. Mol, *Macromol. Chem.*, 1991, 192, 59. Typically the RM mixture, or a formulation comprising it, is coated or otherwise applied onto a substrate where it aligns into uniform orientation, preferably planar alignment (i.e. with the long molecular axes of the calamitic RMs or LC molecules aligned parallel to the substrate), and polymerized in situ in its LC phase at a selected temperature for example by exposure to heat or actinic radiation, preferably by photopolymerization, very preferably by UV-photopolymerization, to fix the alignment of the LC molecules. If necessary, uniform alignment can promoted by additional means like shearing or annealing the LC material, surface treatment of the substrate, or adding surfactants to the LC material.

As substrate for example glass or quartz sheets or plastic films can be used. It is also possible to put a second substrate on top of the coated material prior to and/or during and/or after polymerization. The substrates can be removed after polymerization or not. When using two substrates in case of curing by actinic radiation, at least one substrate has to be transmissive for the actinic radiation used for the polymerization. Isotropic or birefringent substrates can be used. In case the substrate is not removed from the polymerized film after polymerization, preferably isotropic substrates are used.

Suitable and preferred plastic substrates are for example films of polyester such as polyethyleneterephthalate (PET) or polyethylene-naphthalate (PEN), polyvinylalcohol (PVA), polycarbonate (PC) or triacetylcellulose (TAC), very preferably PET or TAC films. As birefringent substrates for example uniaxially stretched plastics film can be used. PET films are commercially available for example from DuPont Teijin Films under the trade name Melinex®.

Preferably the RM mixture is dissolved in a solvent. The solution is then coated or printed onto the substrate, for example by spin-coating or printing or other known techniques, and the solvent is evaporated off before polymerization. In many cases it is suitable to heat the mixture in order to facilitate the evaporation of the solvent.

The RM mixture or formulation can be applied onto the substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

The RM mixture should preferably exhibit planar alignment. This can be achieved for example by rubbing treatment of the substrate, by shearing the material during or after coating, by annealing the material before polymerization, by application of an alignment layer, by applying a magnetic or electric field to the coated material, or by the addition of surface-active compounds to the mixture. Reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

It is also possible to apply an alignment layer onto the substrate and provide the RM mixture onto this alignment layer. Suitable alignment layers are known in the art, like for example rubbed polyimide or alignment layers prepared by photoalignment as described in U.S. Pat. Nos. 5,602,661, 5,389,698 or 6,717,644.

It is also possible to induce or improve alignment by annealing the RM mixture at elevated temperature, but below its clearing temperature, preferably in a range of 2° to 10° below its clearing temperature, very preferably at 10° below its clearing temperature, and most preferably at 2° below its clearing temperature, prior to polymerization.

Polymerization is achieved for example by exposing the polymerizable material to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation. As a source for actinic radiation for example a single UV lamp or a set of UV lamps can be used. When using a high lamp power the curing time can be reduced. Another possible source for actinic radiation is a laser, like for example a UV, IR or visible laser.

The curing time depends, inter alia, on the reactivity of the RM mixture, the thickness of the coated layer, the type of polymerization initiator and the power of the UV lamp. The curing time is preferably $\leq 5$ minutes, very preferably $\leq 3$ minutes, most preferably $\leq 1$ minute. For mass production short curing times of $\leq 30$ seconds are preferred.

The polymerisation process is not limited to one curing step. It is also possible to carry out polymerisation by two or more steps, in which the film is exposed to two or more lamps of the same type, or two or more different lamps in sequence. The curing temperature of different curing steps might be the same or different. The lamp power and dose from different lamps might also be the same or different. In addition to the conditions described above, the process steps may also include a heat step between exposure to different lamps, as described for example in JP 2005-345982 A and JP 2005-265896 A.

Preferably polymerization is carried out in air, but polymerising in an inert gas atmosphere like nitrogen or argon is also possible.

The thickness of a polymer film according to the present invention is preferably from 0.3 to 10 microns, very preferably from 3 to 7 microns, most preferably from 4 to 6 microns.

The polymer films and materials of the present invention can be used outside the switchable LC cell of an LCD or between the substrates, usually glass substrates, forming the switchable LC cell and containing the switchable LC medium (incell application).

The polymer film and materials of the present invention can be used in conventional LC displays, for example displays with vertical alignment like the DAP (deformation of aligned phases), ECB (electrically controlled birefringence), CSH (colour super homeotropic), VA (vertically aligned), VAN or VAC (vertically aligned nematic or cholesteric), MVA (multi-domain vertically aligned), PVA (patterned vertically aligned) or PSVA (polymer stabilised vertically aligned) mode; displays with bend or hybrid alignment like the OCB (optically compensated bend cell or optically compensated birefringence), R-OCB (reflective OCB), HAN (hybrid aligned nematic) or pi-cell ($\pi$-cell) mode; displays with twisted alignment like the TN (twisted nematic), HTN (highly twisted nematic), STN (super twisted nematic), AMD-TN (active matrix driven TN) mode; displays of the IPS (in plane switching) mode, or displays with switching in an optically isotropic phase.

The polymer films of the present invention can be used for various types of optical films, like twisted optical retarders, reflective polarisers and brightness enhancement films.

Above and below, percentages are percent by weight unless stated otherwise. All temperatures are given in degrees Celsius. m.p. denotes melting point, cl.p. denotes clearing point, $T_g$ denotes glass transition temperature. Furthermore, C=crystalline state, N=nematic phase, S=smectic phase and I=isotropic phase. The data between these symbols represent the transition temperatures. $\Delta n$ denotes the optical anisotropy or birefringence ($\Delta n = n_e - n_o$, where $n_o$ denotes the refractive index parallel to the longitudinal molecular axes and $n_e$ denotes the refractive index perpendicular thereto), measured at 589 nm and 20° C. The optical and electrooptical data are measured at 20° C., unless expressly stated otherwise. "Clearing point" and "clearing temperature" mean the temperature of the transition from an LC phase into the isotropic phase.

In a cholesteric RM mixture or film according to the present invention the birefringence $\Delta n$ is defined as follows $$\Delta n = n_e - n_o$$

wherein $n_e$ is the extraordinary refractive index and $n_o$ is the ordinary refractive index, and the average refractive index $\bar{n}$ is given by the following equation:

$$\bar{n} = \sqrt{\frac{2n_o^2 + n_e^2}{3}}$$

The average refractive index $\bar{n}$ and the ordinary refractive index $n_o$ can be measured using an Abbe refractometer. $\Delta n$ can then be calculated from the above equations.

Another way of estimating the birefringence of the cholesteric mixture is to measure the birefringence of the host. This can be done by preparing the mixture without the chiral component and measuring the birefringence of the host mixture on an Abbe refractometer.

Another method of approximating the birefringence of a cholesteric is to measure the birefringence of the nematic host. The birefringence of the nematic host will be very similar to the birefringence of the cholesteric liquid crystal which reflects visible light. Unless stated otherwise, the birefringence values of cholesteric materials or films as given above and below are obtained by this method.

The centre of the reflection band $\lambda_o$ at half the height of the reflection peak is given by the equation $$\lambda_0 = P\bar{n}$$

where P is the helical pitch length of the cholesteric phase and $\bar{n}$ is its average refractive index. When the reflection band is measured using a spectrophotometer, the centre of the reflection band can also be described by the following equation:

$$\lambda_o = (\lambda_{max} - \lambda_{min})/2$$

where $\lambda_{max}$ and $\lambda_{min}$ are the maximum and minimum wavelength for the reflection band at half the height of the reflection peak.

The centre of the reflection band $\lambda_o$ is, unless stated otherwise, measured by measuring the reflection band using a UV-Vis spectrophotometer and measuring the maximum wavelength at half the height of the reflection peak.

The reflection bandwidth $\Delta\lambda$ is defined as follows $$\Delta\lambda = \frac{\lambda_o \Delta n}{\bar{n}}$$

and can also be expressed as $\Delta\lambda = \lambda_{max} - \lambda_{min}$.

The reflection bandwidth $\Delta\lambda$ is, unless stated otherwise, measured by measuring the reflection band of the cholesteric film using an UV-Vis spectrophotometer and measuring the width of the reflection peak at half its height.

In the description and claims of this specification, unless stated otherwise the optical properties like birefringence, centre and bandwidth of the reflection band are determined by the methods as described above.

Unless stated otherwise, the percentages of components of a polymerizable mixture as given above and below refer to the total amount of solids in the mixture polymerizable mixture, i.e. not including solvents.

Unless the context clearly indicates otherwise, as used herein plural forms of the terms herein are to be construed as including the singular form and vice versa.

Throughout the description and claims of this specification, the words "comprise" and "contain" and variations of the words, for example "comprising" and "comprises", mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The following examples are intended to explain the invention without restricting it. The methods, structures and properties described hereinafter can also be applied or transferred to materials that are claimed in this invention but not explicitly described in the foregoing specification or in the examples.

EXAMPLE 1

The RM mixture A is formulated as follows:

| Compound | Concentration (wt. %) |
|---|---|
| (1) | 17.20% |
| (2) | 4.22% |
| (3) | 70.00% |
| (4) | 2.50% |
| (5) | 1.00% |
| Irgacure 907 ® | 5.00% |
| Irganox 1076 ® | 0.08% |

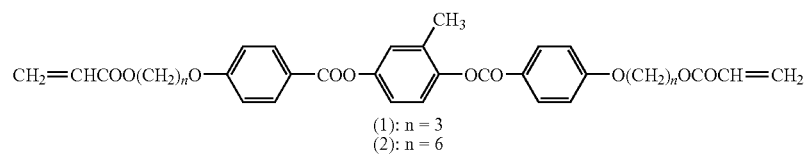

(1): n = 3
(2): n = 6

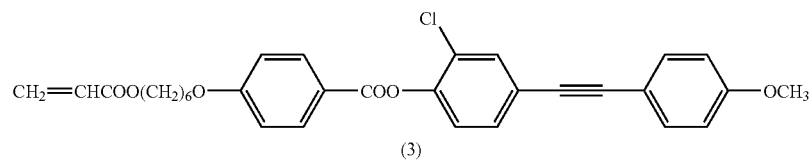

(3)

-continued

| Compound | Concentration (wt. %) |
|---|---|

(4)

(5)

Compounds (1) and (2) are known from the literature and can be prepared for example by the method described in Broer et al., Makromol. Chem. 190, 2255ff and 3201ff (1991), or in analogy thereto. Compound (3) and suitable methods for its preparation are described in US 2008/0143943 A1 and U.S. Pat. No. 6,514,578. Compound (4) can be prepared for example by the methods as described in U.S. Pat. No. 7,223,450 or in analogy thereto. Compound (5) and methods for its preparation are described in GB 2 383 040 A1.

The mixture A exhibits a cholesteric phase at room temperature and a cholesteric-isotropic phase transition at 119.2° C.

A rubbed polyimide coated glass slide is spin coated with a 40% solution of mixture A in toluene at 3000 rpm for 30 seconds. The resulting layer is annealed at 100° C. for 1 minute to align the liquid crystals. The film is then allowed to cool to room temperature, and photopolymerised by exposure to light of 250-450 nm in air at room temperature for 1 minute to give a polymerised cholesteric film, which exhibits a maximum reflection wavelength $\lambda_{max}$ of 641 nm and a bandwidth $\Delta\lambda$ at half height of 115 nm. The transmission vs. wavelength of the polymer film is shown in FIG. 1.

COMPARISON EXAMPLE 1

The RM mixture C is formulated as follows:

| Compound | Concentration (wt. %) |
|---|---|
| (1) | 32.88% |
| (2) | 8.14% |
| (6) | 15.00% |
| (7) | 15.00% |
| (8) | 20.00% |
| (4) | 2.90% |
| (5) | 1.00% |
| Irgacure 907 ® | 5.00% |
| Irganox 1076 ® | 0.08% |

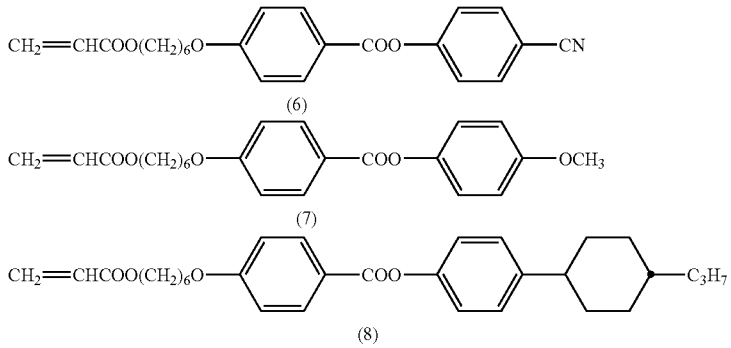

Compounds (6) and (7) are well-known from the literature and can be prepared for example by the method as described in Whitcombe et al., J. Polym. Sci. Polym. Chem. 29, 251-259 (1991), or in analogy thereto Compound (8) and suitable methods for its preparation are described in U.S. Pat. No. 6,344,154.

The mixture C exhibits a cholesteric phase at room temperature and a cholesteric-isotropic phase transition at 79.2° C.

A cholesteric polymer film is prepared from mixture C by the same method as described in example 1, except that the annealing temperature is 77° C. The polymer film exhibits a maximum reflection wavelength $\lambda_{max}$ of 634 nm and a bandwidth $\Delta\lambda$ at half height of 78 nm. The transmission vs. wavelength of the polymer film is shown in FIG. 1.

FIG. 1 allows a direct comparison of the reflection bandwidth $\Delta\lambda$ of the polymer films prepared from mixture A and mixture C, respectively. It can be seen that mixture A, which comprises compound (3) of formula I, gives a polymer film with significantly higher bandwidth than mixture C, where compound (3) has been replaced with compounds (6), (7) and (8).

EXAMPLE 2

The RM mixture B is formulated as follows:

| Compound | Concentration (wt. %) |
| --- | --- |
| (1) | 16.32% |
| (2) | 4.00% |
| (3) | 70.00% |
| (4) | 3.60% |
| (5) | 1.00% |
| Irgacure 907 ® | 5.00% |
| Irganox 1076 ® | 0.08% |

The mixture B exhibits a cholesteric phase at room temperature and a cholesteric-isotropic phase transition at 118.2° C.

Figure 2:
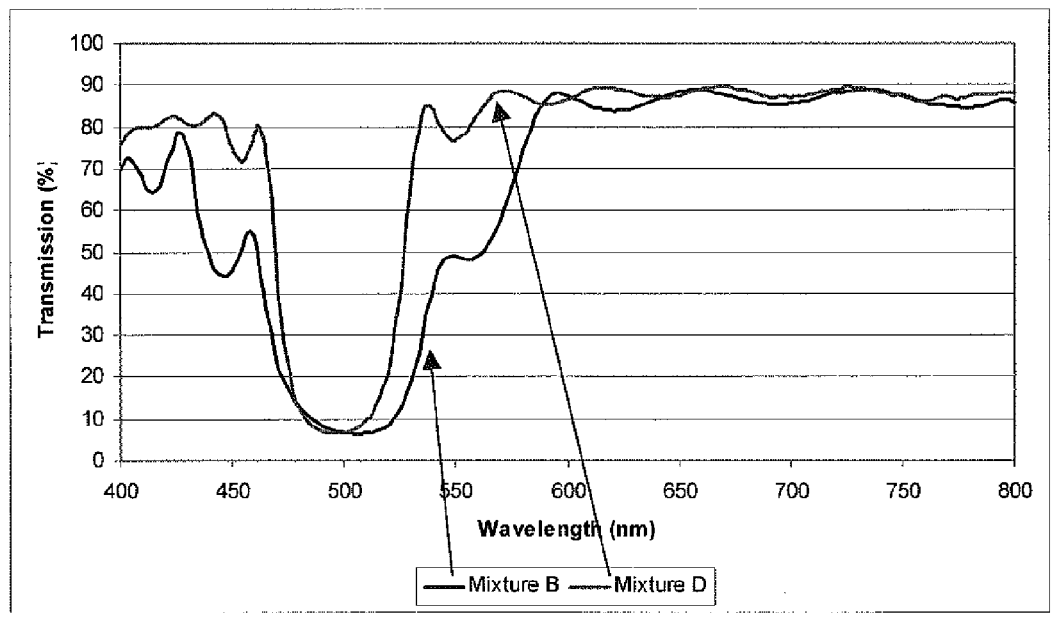
FIG. 2 shows the transmission versus wavelength plots for a polymer film of example 2 and a polymer film of comparison example 2.

A cholesteric polymer film is prepared from mixture B by the same method as described in example 1. The polymer film exhibits a maximum reflection wavelength $\lambda_{max}$ of 501 nm and a bandwidth $\Delta\lambda$ at half height of 68 nm. The transmission vs. wavelength of the polymer film is shown in FIG. 2.

COMPARISON EXAMPLE 2

The RM mixture D is formulated as follows:

| Compound | Concentration (wt. %) |
| --- | --- |
| (1) | 32.20% |
| (2) | 7.97% |
| (6) | 15.00% |
| (7) | 15.00% |
| (8) | 20.00% |
| (4) | 3.75% |
| (5) | 1.00% |
| Irgacure 907 ® | 5.00% |
| Irganox 1076 ® | 0.08% |

The mixture D exhibits a cholesteric phase at room temperature and a cholesteric-isotropic phase transition at 76.7° C.

A cholesteric polymer film is prepared from mixture D by the same method as described in example 1, except that the annealing temperature is 74° C. The polymer film exhibits a maximum reflection wavelength $\lambda_{max}$ of 501 nm and a bandwidth A2%, at half height of 56 nm. The transmission vs. wavelength of the polymer film is shown in FIG. 2.

FIG. 2 allows a direct comparison of the reflection bandwidth $\Delta\lambda$ of the polymer films prepared from mixture B and mixture D, respectively. It can be seen that mixture B, which comprises compound (3) of formula I, gives a polymer film with significantly higher bandwidth than mixture D, where compound (3) has been replaced with compounds (6), (7) and (8).

EXAMPLE 3

The RM mixture E is formulated as follows:

| Compound | Concentration (wt. %) |
| --- | --- |
| (1) | 16.94% |
| (2) | 4.23% |
| (3) | 70.00% |
| (4) | 2.75% |
| (5) | 1.00% |
| Irgacure 907 ® | 5.00% |
| Irganox 1076 ® | 0.08% |

The mixture E exhibits a cholesteric phase at room temperature and a cholesteric-isotropic phase transition at 116.8° C.

Figure 3:
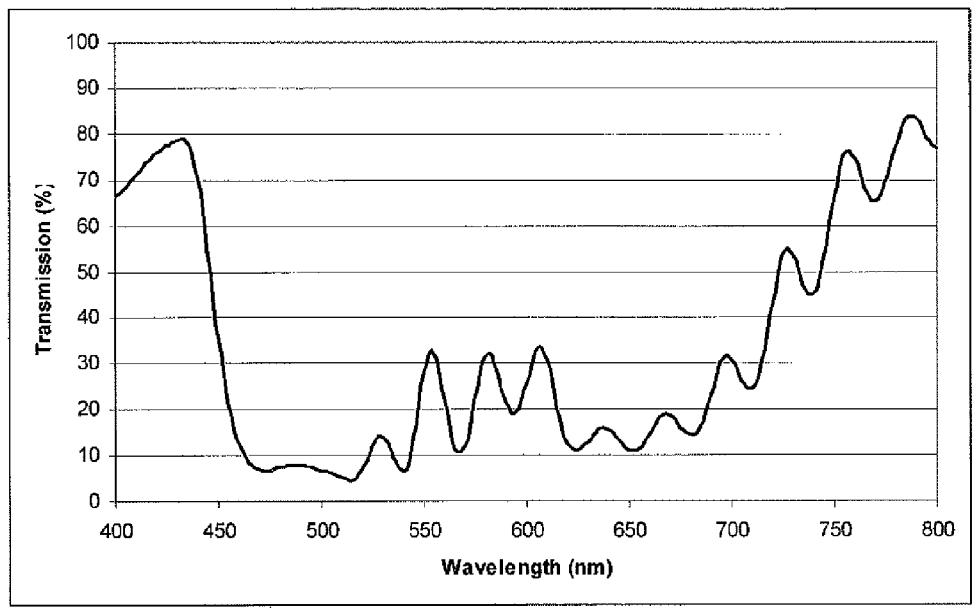
FIG. 3 shows the transmission versus wavelength plot for a polymer film of example 3.

A rubbed polyimide coated glass slide is spin coated with a 50% solution of mixture E in toluene at 1000 rpm for 30 seconds. The resulting layer is annealed at 100° C. for 1 minute to align the liquid crystals. The film is then allowed to cool to 80° C., and photopolymerised by exposure to light of 250-450 nm in air at 80° C. for 1 minute using a cure power of 30 mw/cm² to give a polymerised cholesteric film, which exhibits a maximum reflection wavelength $\lambda_{max}$ of 710 nm and a bandwidth $\Delta\lambda$ at half height of 260 nm. The transmission vs. wavelength of the polymer film is shown in FIG. 3. The film exhibits a broad reflection bandwidth.

EXAMPLE 4

The RM mixture F is formulated as follows:

| Compound | Concentration (wt. %) |
| --- | --- |
| (1) | 22.94% |
| (2) | 5.73% |
| (3) | 49.75% |
| (4) | 2.50% |
| (5) | 1.00% |
| (6) | 10.00% |
| (9) | 2.00% |
| (10) | 1.00% |
| Irgacure 907 ® | 5.00% |
| Irganox 1076 ® | 0.08% |

| Compound | Concentration (wt. %) |
|---|---|

The chain transfer agent (9) is described in U.S. Pat. No. 6,319,963. The polymerizable dye (10) is commercially available (Sigma-Aldrich).

The mixture F exhibits a cholesteric phase at room temperature and a cholesteric-isotropic phase transition at 95.1° C.

Figure 4:
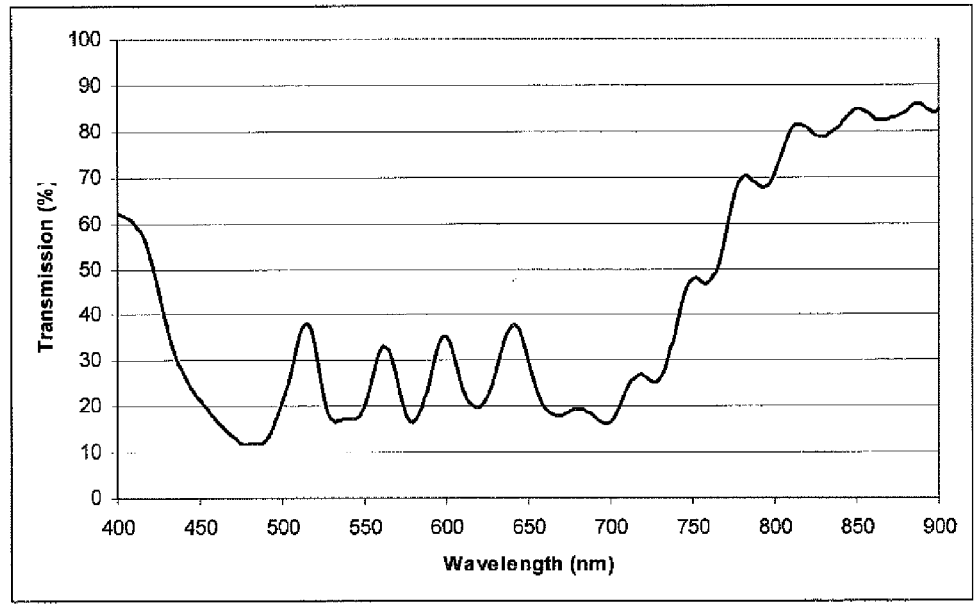
FIG. 4 shows the transmission versus wavelength plot for a polymer film of example 4.

A rubbed polyimide coated glass slide is spin coated with a 50% solution of mixture E in toluene at 1000 rpm for 30 seconds. The resulting layer is annealed at 93° C. for 1 minute to align the liquid crystals. The film is then allowed to cool to 80° C., and photopolymerised by exposure to light of 250-450 nm in air at 80° C. for 1 minute using a cure power of 75 mw/cm² to give a polymerised cholesteric film, which exhibits a maximum reflection wavelength $\lambda_{max}$ of 760 nm and a bandwidth $\Delta\lambda$ at half height of 335 nm. The transmission vs. wavelength of the polymer film is shown in FIG. 4. The film exhibits a broad reflection bandwidth.

EXAMPLE 5

The following cholesteric RM mixture is formulated:

| Compound | Concentration (wt. %) |
|---|---|
| (1) | 33.00% |
| (3) | 61.50% |
| (4) | 3.00% |
| (5) | 1.00% |
| (10) | 1.30% |
| Irgacure 819 ® | 0.20% |

Figure 5:
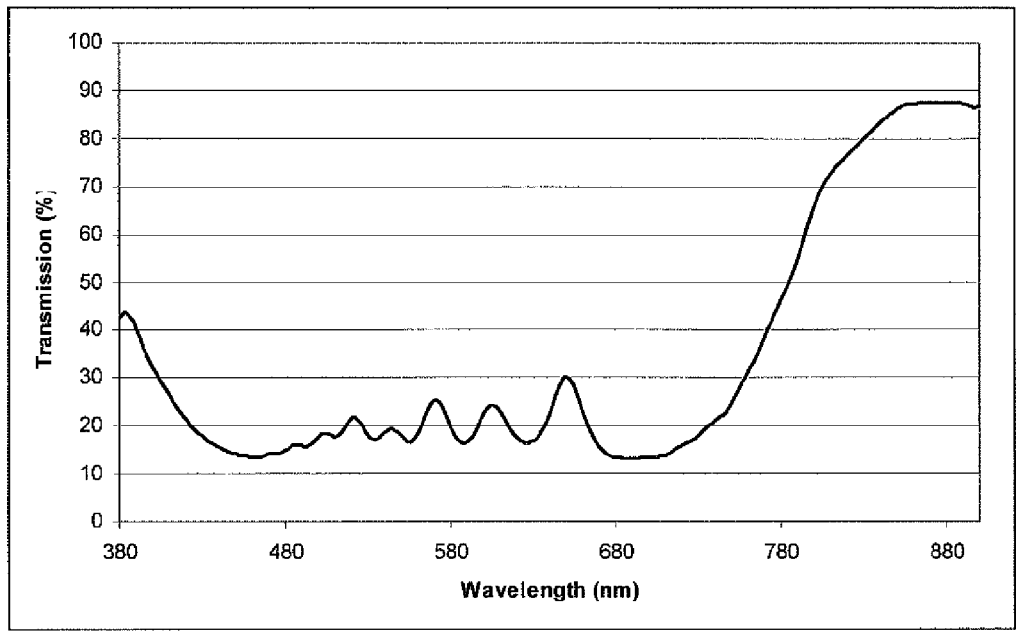
FIG. 5 shows the transmission versus wavelength plot for a polymer film of example 5.

The mixture is converted to a 40% solution in toluene:cyclohexanone and then filtered to 0.2 μm. The resulting solution is bar coated using a Meyer bar 10 onto rubbed PET. The resulting film is annealed at 100° C. for 1 minute. The aligned film is exposed to 0.33 mW/cm² for 120 seconds at 80° C. in a nitrogen atmosphere under TLK lamps. The film is post cured in the Dr Honle at 20 mW/cm² for 30 seconds in a nitrogen atmosphere. The transmission vs. wavelength of the polymer film is shown in FIG. 5. The film exhibits a broad reflection bandwidth.

EXAMPLE 6

The following cholesteric RM mixture is formulated:

| Compound | Concentration (wt. %) |
|---|---|
| (1) | 32.50% |
| (3) | 62.475% |
| (4) | 3.00% |
| (10) | 1.30% |
| Irgacure 651 ® | 0.70% |
| TEGO ®Rad 2500 | 0.025% |

Figure 6:
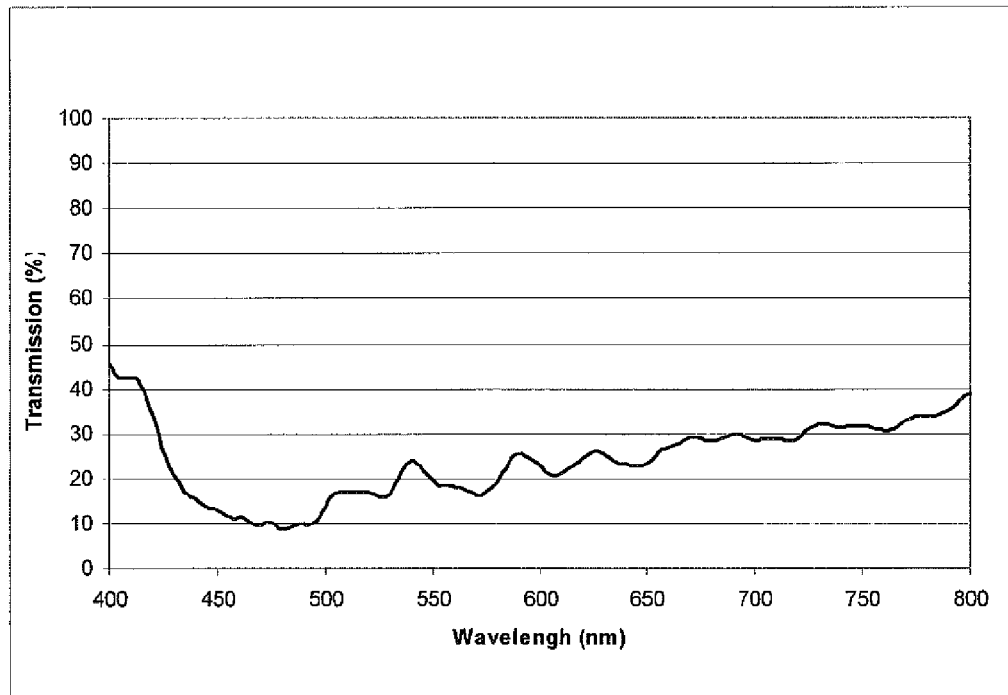
FIG. 6 shows the transmission versus wavelength plot for a polymer film of example 6.

TEGO® Rad 2500 is a commercially available, crosslinkable glide, anti-blocking and degassing additive (from Evonik Industries). The mixture is converted to a 40% solution in toluene:cyclohexanone and then filtered to 0.2 μm. The resulting solution is bar coated using an RK bar 3 onto rubbed PET. The resulting film is annealed at 100° C. for 1 minute. The aligned film is exposed to 0.35 mW/cm² for 240 seconds at 80° C. in a nitrogen atmosphere under TLK lamps. The film is post cured in the Dr Honle at 50 mW/cm² for 60 seconds in a nitrogen atmosphere. The transmission vs. wavelength of the polymer film is shown in FIG. 6. The film exhibits a broad reflection bandwidth.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure[s] of all applications, patents and publications, cited herein and of corresponding European application No. EP 09002018, filed Feb. 13, 2009 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A mixture comprising the following components
A) from 30 to 80% of component A consisting of one or more compounds of formula I

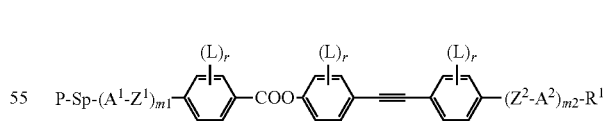

wherein
P is a polymerizable group,
Sp is a spacer group or a single bond,
$A^{1,2}$ independently of each other denote 1,4-phenylene or naphthalene-2,6-diyl, wherein one or more CH groups are optionally replaced by N, and which are unsubstituted or substituted by one or more groups L,
$Z^{1,2}$ are, in case of multiple occurrence each independently of one another, —COO—, —OCO—, —O—COO—, —C≡C— or a single bond, $R^1$ denotes P-Sp-, F, Cl, —CN, —NO$_2$, —NCO, —NCS, —OCN, —SCN, —SF$_5$, or straight chain or branched alkyl with 1 to 12 C atoms, wherein one or more CH$_2$ groups are optionally replaced by —O—, —S—, —CO—, —CS— or NR$^0$ in such a manner that O and/or S atoms are not directly linked with each other, and wherein one or more H atoms are optionally replaced by F or Cl, L are, in case of multiple occurrence each independently of one another, P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl or heteroaryl with 1 to 12 C atoms, and straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl, X is halogen, $R^0$ and $R^{00}$ are independently of each other H or alkyl with 1 to 12 C atoms, r are each independently of one another 0, 1, 2, 3 or 4, preferably 0 or 1, m1 and m2 are independently of each other 0 or 1, and B) from 5 to 50% of component B consisting of one or more reactive mesogens having two or more polymerizable groups, and C) from 0.2 to 10% of component C consisting of one or more compounds of formula II

II

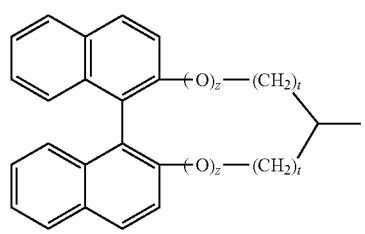

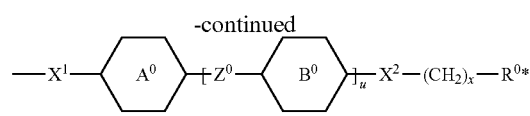

wherein $R^{0*}$ is H or $P^0$, $P^0$ is a polymerizable group, $A^0$ and $B^0$ are, in case of multiple occurrence independently of one another, 1,4-phenylene that is unsubstituted or substituted with 1, 2, 3 or 4 groups L, wherein L is as defined above, or trans-1,4-cyclohexylene, $X^1$ and $X^2$ are independently of each other —O—, —COO—, —OCO—, —O—CO—O— or a single bond, $Z^0$ are, in case of multiple occurrence independently of one another, —COO—, —OCO—, —O—CO—O—, —OCH$_2$—, —CH$_2$O—, —CF$_2$O—, —OCF$_2$—, —CH$_2$CH$_2$—, —(CH$_2$)$_4$—, —CF$_2$CH$_2$—, —CH$_2$CF$_2$—, —CF$_2$CF$_2$—, —C≡C—, —CH=CH—, —CH=CH—COO—, —OCO—CH=CH— or a single bond, t are, independently of each other, 0, 1, 2 or 3, u is 0, 1 or 2, x is 0 or an integer from 1 to 12, z is 0 or 1, and wherein the naphthalene rings can additionally be substituted with one or more identical or different groups L, wherein L is as defined above, and D) from 0.1 to 8% of component D consisting of one or more polymerization initiators;

and which mixture has a reflection peak in the visible wavelength range.

2. A mixture according to claim 1, wherein in that in formula I m1=m2=0 and $R^1$ is alkyl, alkoxy, thioalkyl, alkylcarbonyl, alkoxycarbonyl, alkylcarbonyloxy or alkoxycarbonyloxy with 1 to 12 C atoms.

3. A mixture according to claim 1, wherein the one or more compounds of formula II are of formula IIa IIa

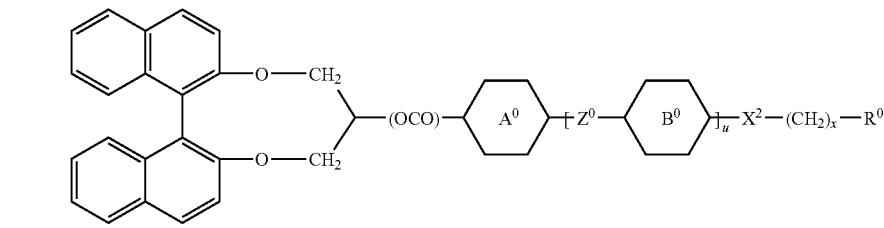

wherein $A^0$, $B^0$, $Z^0$, $R^0$, u and x have the meanings given for the compound of formula II, and (OCO) denotes —O—CO— or a single bond.

4. A mixture according to claim 1, wherein the one or more compounds of component B are of formula IIIa

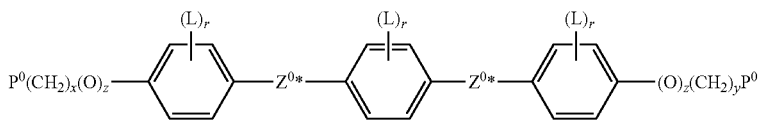

IIIa wherein $Z^{0*}$ are, each independently of each other, —COO—, —OCO—, —CH$_2$CH$_2$—, —CF$_2$O—, —OCF$_2$—, —CH=CH—, —CH=CH—, —OCO—CH=CH—, —CH=CH—COO—, or a single bond, $P^0$ is, each independently of one another, a polymerizable group, L are, in case of multiple occurrence each independently of one another, P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl or heteroaryl with 1 to 12 C atoms, and straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl, r are, each independently of each other, 0, 1, 2, 3 or 4, x and y are independently of each other 0 or identical or different integers from 1 to 12, and z is 0 or 1, with z being 0 if the adjacent x or y is 0.

5. A mixture according to claim 1, comprising from 3 to 4% of component D.

6. A mixture according to claim 1, further comprising a component E consisting of one or more surfactants.

7. A mixture according to claim 1, comprising the following components a component A, a component B, which optionally comprises one or more compounds of formula IIIa

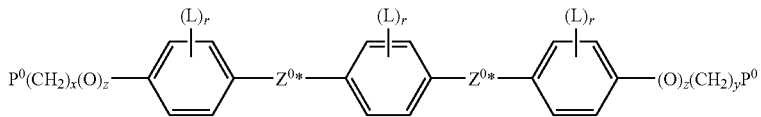

IIIa wherein $Z^0$ are, each independently of each other, —COO—, —OCO—, —CH$_2$CH$_2$—, —CF$_2$O—, —OCF$_2$—, —C≡C—, —CH=CH—, —OCO—CH=CH—, —CH=CH—COO—, or a single bond, $P^0$ is, each independently of one another, a polymerizable group, L are, in case of multiple occurrence each independently of one another, P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl or heteroaryl with 1 to 12 C atoms, and straight chain or branched alkyl, alkoxy, alkylcarbonyl, alkoxycarbonyl, alkylcarbonyloxy or alkoxycarbonyloxy with 1 to 12 C atoms, wherein one or more H atoms are optionally replaced by F or Cl, r are, each independently of each other, 0, 1, 2, 3 or 4, x and y are independently of each other 0 or identical or different integers from 1 to 12, and z is 0 or 1, with z being 0 if the adjacent x or y is 0, a component C, a component D consisting of one or more polymerization initiators, optionally a component E consisting of one or more surfactants, and one or more of the following components a component F consisting of one or more RMs different from compounds of formula I, II or IIIa, a component G consisting of one or more chain transfer agents, a component H consisting of one or more dyes, and a component I consisting of one or more stabilizers.

8. A mixture according to claim 1, comprising the following components from 0.01 to 5% of compounds of component D, optionally from 0.1 to 2% of compounds of component E consisting of one or more surfactants, optionally from 2 to 30% of compounds of component F consisting of one or more RMs different from compounds of formula I, II or IIIa, optionally from 0.1 to 5% of compounds of component G consisting of one or more chain transfer agents, optionally from 0.1 to 5% of compounds of component H consisting of one or more dyes, and optionally from 0.01 to 0.2 of compounds of component I consisting of one or more stabilizers.

9. An anisotropic polymer or polymer film obtainable by polymerizing a mixture according to claim 1 in its oriented state in form of a thin film or layer.

10. An optical, electrooptical or electronic component or device, or broadband reflective optical polarizer, comprising a mixture according to claim 1, or an anisotropic polymer or polymer film obtainable by polymerizing said mixture in its oriented state in form of a thin film or layer.

11. A device or component according to claim 10, which is selected from the group consisting of electrooptical displays, LCDs, optical films, polarizers, compensators, beam splitters, reflective films, alignment layers, colour filters, holographic elements, hot stamping foils, coloured images, decorative and security markings, LC pigments, adhesives, non-linear optic (NLO) devices, optical information storage devices, electronic devices, organic semiconductors, organic field effect transistors (OFET), integrated circuits (IC), thin film transistors (TFT), Radio Frequency Identification (RFID) tags, organic light emitting diodes (OLED), organic light emitting transistors (OLET), electroluminescent displays, organic photovoltaic (OPV) devices, organic solar cells (O-SC), organic laser diodes (O-laser), organic integrated circuits (O-IC), lighting devices, sensor devices, electrode materials, photoconductors, photodetectors, electrophotographic recording devices, capacitors, charge injection layers, Schottky diodes, planarizing layers, antistatic films, conducting substrates, conducting patterns, photoconductors, electrophotographic applications, electrophotographic recording, organic memory devices, biosensors, biochips, optoelectronic devices requiring similar phase shift at multiple wavelengths, combined CD/DVD/HD-DVD/Blu-Rays, reading, writing, re-writing data storage systems, and cameras.

12. A mixture according to claim 7, wherein component B comprises one or more compounds of formula IIIa.

13. A mixture according to claim 7, wherein the one or more compounds of formula II are of formula IIa

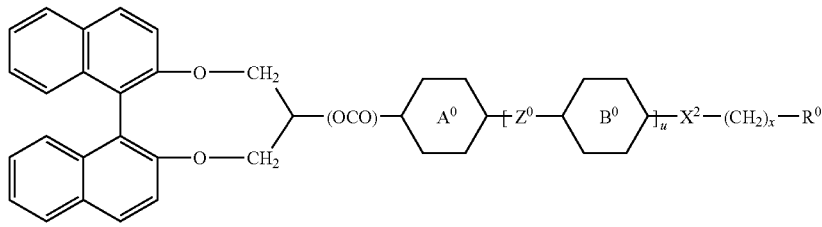

IIa wherein $A^0$, $B^0$, $Z^0$, $R^0$, u and x have the meanings given for the compound of formula II, and (OCO) denotes —O—CO— or a single bond.

14. A mixture according to claim 1, wherein $P^0$ is an acryl, methacryl, oxetane, epoxy, vinyl, vinyloxy, propenyl ether or styrene group.

15. A mixture according to claim 1, wherein the one or more compounds of formula I are of formula Ia:

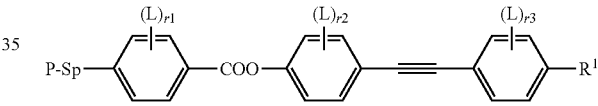

Ia wherein P, Sp and $R^1$ have the meanings given for the compound of formula I, and r1, r2 and r3 are independently of each other 0, 1, 2, 3 or 4.

16. A mixture according to claim 15, wherein r2 is different from 0, and r1 and/or r3 are 0.

17. A mixture according to claim 1, comprising the following components
from 40 to 70% of compounds of component A,
from 20 to 40% of compounds of component B,
from 2 to 5% of compounds of component C,
from 0.02 to 5% of compounds of component D,
optionally from 0.1 to 2% of compounds of component E consisting of one or more surfactants,
optionally from 2 to 30% of compounds of component F consisting of one or more RMs different from compounds of formula I, II or IIIa,
optionally from 0.1 to 5% of compounds of component G consisting of one or more chain transfer agents,
optionally from 0.1 to 5% of compounds of component H consisting of one or more dyes, and
optionally from 0.01 to 0.2 of compounds of component I consisting of one or more stabilizers.

18. A mixture according to claim 1, wherein component B comprises one or more compounds of formula I wherein $R^1$ is P-Sp.

19. A mixture according to claim 1, comprising from 40 to 70% of compounds of component A.

20. A mixture according to claim 1, which has a bandwidth Δλ of the reflected wavelength band at half height of between 115 to 335 nm.

* * * * *

UNITED STATES PATENT AND TRADEMARK OFFICE
CERTIFICATE OF CORRECTION

PATENT NO. : 8,021,571 B2  
APPLICATION NO. : 12/704648  
DATED : September 20, 2011  
INVENTOR(S) : Alison Linda May et al.

Page 1 of 1

It is certified that error appears in the above-identified patent and that said Letters Patent is hereby corrected as shown below:

In The Claims:

In claim 4, at column 47, line 18 reads: "-CH≡CH-, -CH=CH-, -OCO-CH=CH-," should read -- -C≡C-, -CH=CH-, -OCO-CH=CH- --.

Signed and Sealed this  
Sixth Day of March, 2012

David J. Kappos  
*Director of the United States Patent and Trademark Office*